United States Patent
Fujii et al.

(10) Patent No.: US 7,719,516 B2
(45) Date of Patent: May 18, 2010

(54) ACTUATOR HAVING AN INPUTTING FUNCTION

(75) Inventors: Noboru Fujii, Shinagawa (JP); Takashi Arita, Shinagawa (JP); Nobuyoshi Shimizu, Shinagawa (JP) j; Akio Nakamura, Shinagawa (JP); Shinichiro Akieda, Shinagawa (JP); Shigemi Kurashima, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 935 days.

(21) Appl. No.: 10/909,329

(22) Filed: Aug. 3, 2004

(65) Prior Publication Data
US 2005/0179649 A1    Aug. 18, 2005

(30) Foreign Application Priority Data
Feb. 17, 2004    (JP)    ............... 2004-039181

(51) Int. Cl.
 *G09G 5/00*    (2006.01)
(52) U.S. Cl. ..................................... 345/156
(58) Field of Classification Search ................ 345/156, 345/184, 161; 310/12; 335/220
See application file for complete search history.

(56) References Cited
U.S. PATENT DOCUMENTS

| | | | | |
|---|---|---|---|---|
| 5,675,195 A | * | 10/1997 | Takei | ............... 310/12 |
| 5,929,846 A | * | 7/1999 | Rosenberg et al. | ............ 345/161 |
| 5,986,646 A | * | 11/1999 | Chen et al. | ............ 345/173 |
| 6,064,128 A | * | 5/2000 | Yagoto et al. | ............ 310/12 |
| 2003/0193475 A1 | * | 10/2003 | Rosenberg et al. | ............ 345/156 |
| 2004/0056745 A1 | * | 3/2004 | Watanabe et al. | ............ 335/220 |

FOREIGN PATENT DOCUMENTS

| | | |
|---|---|---|
| JP | 10-117470 | 5/1998 |
| JP | 2000-39303 | 2/2000 |
| JP | 2002-342018 | 11/2002 |

OTHER PUBLICATIONS

Japanese Office Action issued on Mar. 17, 2009 in corresponding Japanese Patent Application 2004-039181.
Japanese Office Action dated Jun. 16, 2009 and issued in corresponding Japanese Patent Application 2004-039181.

* cited by examiner

*Primary Examiner*—Richard Hjerpe
*Assistant Examiner*—Shaheda A Abdin
(74) *Attorney, Agent, or Firm*—Staas & Halsey LLP

(57) ABSTRACT

An actuator includes: a magnetic field generator that has different magnetic poles alternately arranged in a plane, with a predetermined position being the center of the magnetic poles; a coil holder that holds a plurality of coils that are radially arranged and face the magnetic field generator, relative motion being caused between the magnetic field generator and the coil holder; and an electromagnetic conversion unit that detects the relative motion and is mounted on either the magnetic field generator or the coil holder.

34 Claims, 26 Drawing Sheets

Fig.24

| ACTUATOR DRIVING COORDINATES | DETECTED COORDINATE VALUES | |
|---|---|---|
| (+X, +Y) | (V+x, V+y) | |
| | (V+x, V+y) | LARGEST/ SMALLEST |
| (-X, +Y) | (V-x, V+y) | |
| | (V-x, V+y) | LARGEST/ SMALLEST |
| (-X, -Y) | (V-x, V-y) | |
| | (V-x, V-y) | LARGEST/ SMALLEST |
| (+X, -Y) | (V+x, V-y) | |
| | (V+x, V-y) | LARGEST/ SMALLEST |

$$x = X \cdot [Lx + Wx \{1 - (Y/Ly)^2\}] / Lx \quad \cdots \cdots (1)$$

$$y = Y \cdot [Ly + Wy \{1 - (X/Lx)^2\}] / Ly \quad \cdots \cdots (2)$$

ACTUATOR HAVING AN INPUTTING FUNCTION

BACKGROUND OF THE INVENTION

1. Field of the Invention

The present invention generally relates to an actuator that is incorporated into an input device such as a mouse used in conjunction with a personal computer, and more particularly, to an actuator that includes a mobile unit to move in-plane by virtue of magnetic force and can perform accurate coordinate input.

2. Description of the Related Art

Conventionally, small-sized actuators each having a mobile unit that moves in-plane by virtue of magnetic force have been developed. Such actuators are expected to be novel devices for transmitting various types of information from computers to operators. For example, an actuator of the above kind can be incorporated into a mouse that is normally used in conjunction with a personal computer. A conventional mouse has been used as an input device for performing input from an operator to a computer. In a case where the above actuator is incorporated into a conventional mouse, signals generated from the computer can be transmitted to an operator. In this manner, the conventional mouse can be used as a man-machine interface.

Japanese Unexamined Patent Publication No. 10-117470 (hereinafter referred to as Patent Document 1) discloses a small-sized actuator of the in-plane mobile type. This actuator includes a coil unit that has a small loop coil and a large loop coil arranged in one plane, and a magnet unit that has four permanent magnets secured onto a base plate. The four permanent magnets generate magnetic flux that crosses the loop coils in a chain-like fashion. In this actuator, relative motion can be caused between the coil unit and the magnet unit that are maintained in parallel with each other. Either the coil unit or the magnet unit can be moved in the plane by virtue of a thrust force that is generated at the time of energizing the loop coils.

Patent Document 1 also discloses a structure in which a scale magnet for position detection is attached to the mobile magnet body, and a MR sensor is fixed in such a position as to face the scale magnet and to perform position detection. With this structure, feedback control is performed with signals supplied from the MR sensor, so that the mobile unit can be moved to a desired position.

An input device such as a mouse is naturally required to have a function of performing coordinate input. Therefore, the above described actuator having a mobile unit that moves in a plane upon receipt of a signal from the outside should have a structure as an input device.

The actuator disclosed in Patent Document 1, however, is a device that is to be incorporated into an optical apparatus, for example. In an optical apparatus, the actuator moves a lens (a driven part) in a plane and positions the lens at a predetermined location. The actuator disclosed in Patent Document 1 is not to be incorporated into an input device such as a mouse. Particularly, the actuator disclosed in Patent Document 1 cannot be used as a coordinate input device incorporated into an input device such as a mouse, because the actuator cannot detect the position of a part that is moved by an operator to perform an input operation.

As described above, actuators having in-plane mobile parts have been developed. However, there has not been a disclosure of an actuator that operates upon receipt of a signal from a computer, and also functions as an input device for inputting instructions from operators, when incorporated into an input device such as a mouse.

SUMMARY OF THE INVENTION

It is therefore an object of the present invention to provide an actuator in which the above disadvantage is eliminated.

A more specific object of the present invention is to provide an actuator that includes an in-plane mobile driving unit and has a function of performing accurate input operations.

The above objects of the present invention are achieved by an actuator comprising: a magnetic field generator that has different magnetic poles alternately arranged in a plane, with a predetermined position being the center of the magnetic poles; a coil holder that holds a plurality of coils that are radially arranged and face the magnetic field generator, relative motion being caused between the magnetic field generator and the coil holder; and an electromagnetic conversion unit that detects the relative motion and is mounted on one of the magnetic field generator and the coil holder.

BRIEF DESCRIPTION OF THE DRAWINGS

Other objects, features and advantages of the present invention will become more apparent from the following detailed description when read in conjunction with the accompanying drawings, in which:

FIG. 24 shows a data table containing correction data;

DESCRIPTION OF THE PREFERRED EMBODIMENTS

The following is a description of embodiments of the present invention, with reference to the accompanying drawings.

Figure 1A:
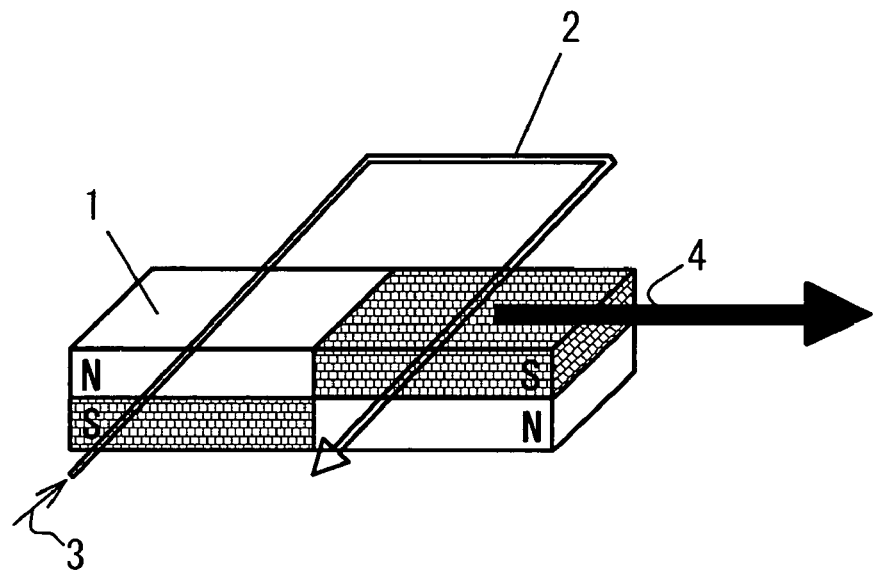
FIG. 1A illustrates the Fleming's left-hand rule.
Figure 1B:
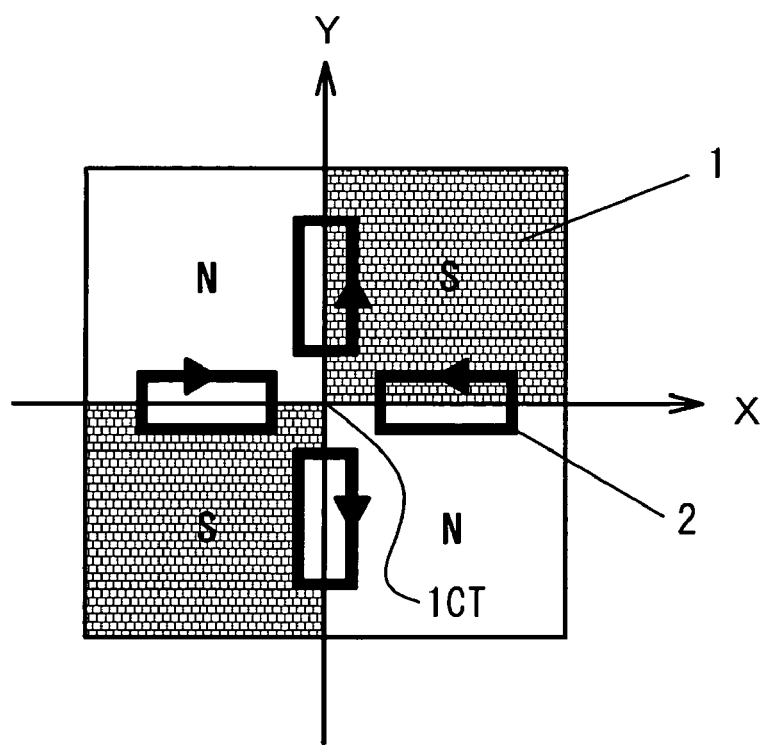
FIG. 1B schematically illustrates a structure that includes a magnet unit and coils in accordance with the present invention.

Referring to FIGS. 1A and 1B, the principles of the present invention will be first described. The Fleming's left-hand rule is applied to the present invention. FIG. 1A illustrates the Fleming's left-hand rule. According to the Fleming's left-hand rule, when current 3 is applied, as indicated by the white arrow, to a coil 2 placed near a magnet unit 1, thrust force 4 is generated in the direction indicated by the black arrow, as shown in FIG. 1A.

FIG. 1B schematically illustrates a structure that includes a magnet unit and coils in accordance with the present invention. As shown in FIG. 1B, the magnet unit 1 has different magnetic poles (two North poles and two South poles in this example structure) that are alternately arranged in a plane and surround the center position 1CT. Coils 2 (four coils in this example structure) are placed to face the magnet unit 1. The coils 2 are fixed to a mobile unit (not shown), and the current to be applied to the coils 2 is controlled so that the coils 2 two-dimensionally move in the X-Y plane by virtue of the thrust force shown in FIG. 1A. The present invention provides an in-plane moving actuator that is embodied by this example structure.

Figure 2A:
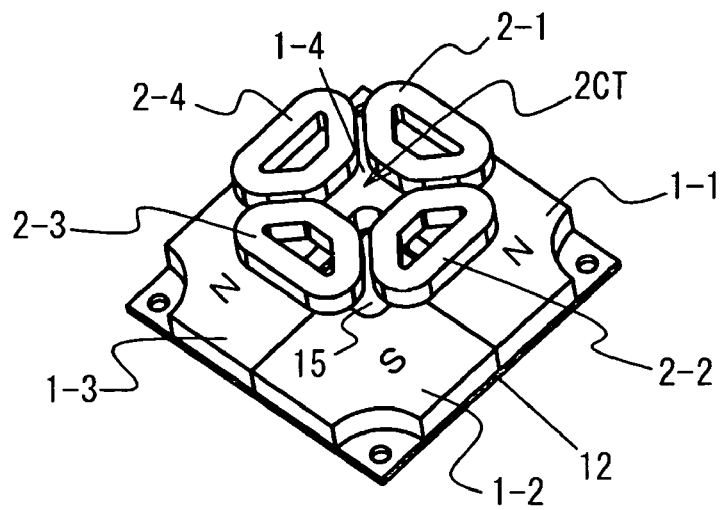
FIGS. 2A through 2C illustrate the structure of FIG. 1B in greater detail.
Figure 2B:
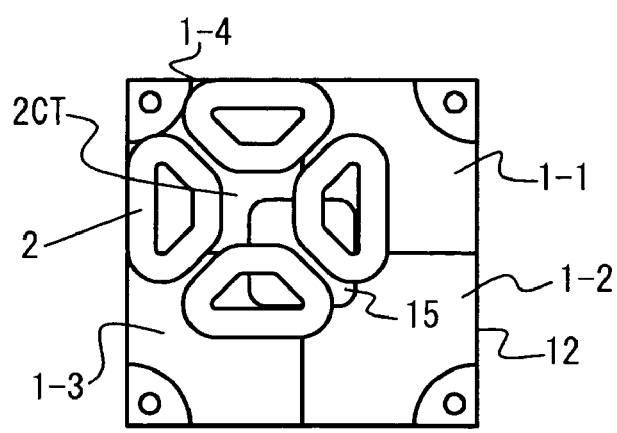
Figure 2C:
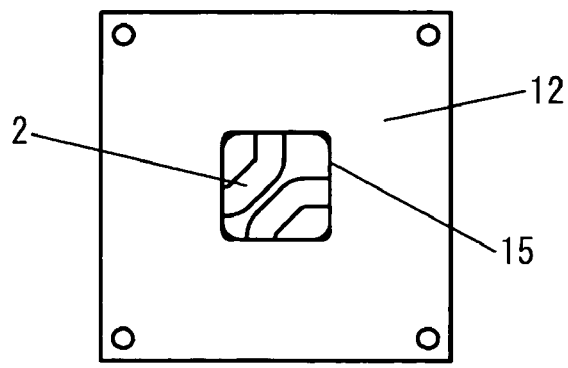

FIGS. 2A through 2C illustrate the example structure of FIG. 1B in greater detail. FIG. 2A is a perspective view of the structure, showing the relationship between the magnet unit 1 and the coils 2. FIG. 2B is a plan view of the structure, and FIG. 2C is a bottom view of the structure. In FIGS. 2A through 2C, the magnet unit 1 is fixed onto a substrate 12. Four coils 2-1 through 2-4 are placed to face the magnet unit 1 that is arranged in a plane. The current to be applied to the coils 2 is controlled so that the coils 2 can two-dimensionally move (in-plane) relative to the magnet unit 1. In this structure, the substrate 12 has an opening 15 that is used for detecting movement of the coils 2. The opening 15 is used for detecting movement in some cases, but may not be employed in other cases. This aspect of the present invention will be described later.

The four coils 2-1 through 2-4 are radially arranged, forming a space 2CT in the middle. Although the coils 2 are shifted from the center in FIGS. 2A through 2C, the center (including the space 2CT in the middle) of the coils 2 faces the center position 1CT (part of the opening 15 in FIGS. 2A through 2C) of the magnet unit 1 in the predetermined initial state. Also, the magnet unit 1 shown in FIGS. 1B, 2A, and 2B, may be either a permanent magnet unit or an electromagnet unit. In a case of a permanent magnet unit, single-pole magnets may be combined, or a magnetic body may be polarized to form the magnetic poles of the magnet unit 1. For example, the magnet unit 1 shown in FIG. 1B may be formed by combining two single-pole magnets or magnetizing a magnetic body to have four magnetic poles. In the structure shown in FIGS. 2A through 2C, the coils 2 may be fixed, and the magnet unit 1 may be moved instead. In the following embodiments, however, the magnet unit 1 is fixed while the coils 2 are moved.

Figure 3:
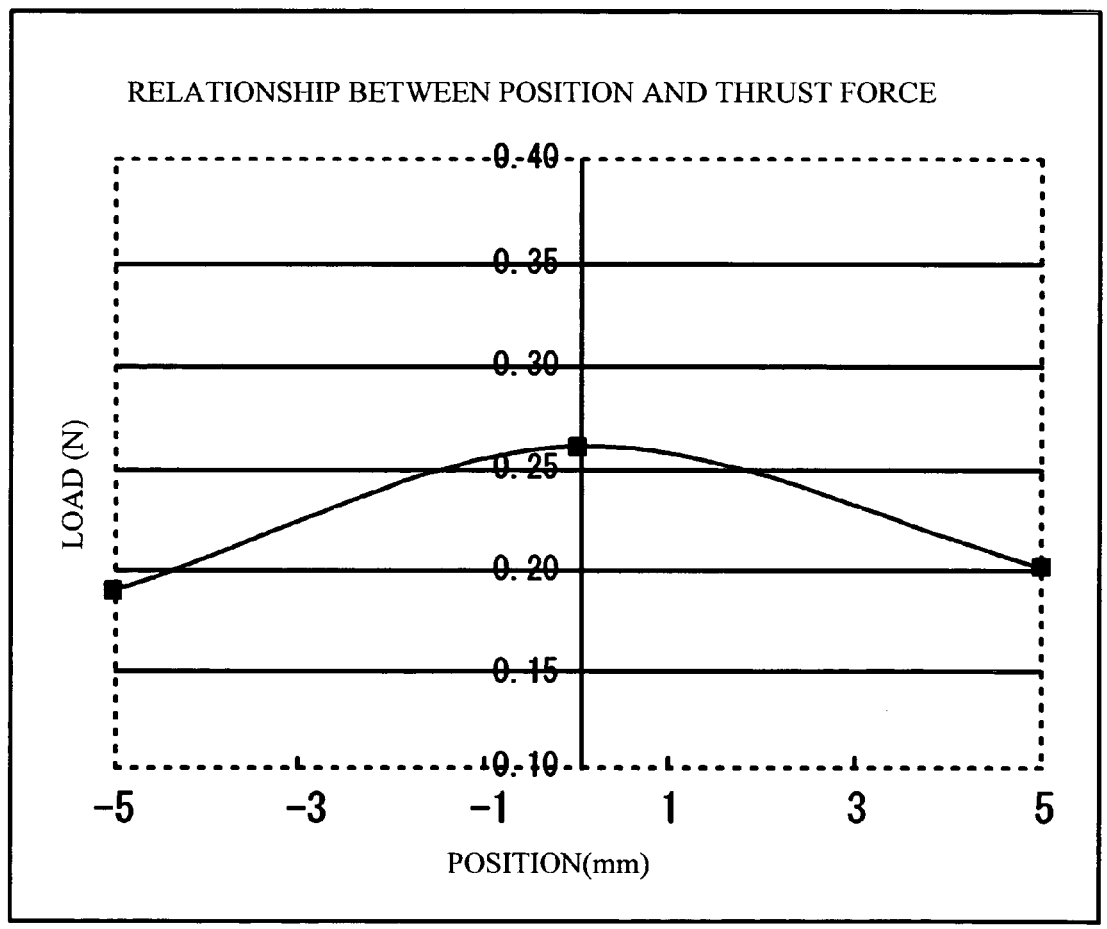
FIG. 3 shows the relationship between the coil position and thrust force in the X direction and the Y direction shown in FIG. 1B.

FIG. 3 shows the relationship between the coil position and thrust force (load N) in the X direction and the Y direction shown in FIG. 1B. In the graph shown in FIG. 3, the abscissa axis indicates the movement (mm) of the coil position, and the ordinate axis indicates the load N generated in the coils 2. This graph shows an example case where a current of 200 mA was applied to the coils 2, and a 2000 gauss magnet was employed. The center position shown in FIG. 3 corresponds to the situation in which each of the coils 2 is located over a North pole and a South pole of the magnet unit 1 shown in FIG. 1B. In the center position shown in FIG. 3, the load B became largest. As can be seen from FIG. 3, even in a position shifted from the center by ±5 mm, the load N was still large enough. In the following, more specific embodiments of the present invention will be described in detail, with reference to the accompanying drawings.

First Embodiment

Figure 4:
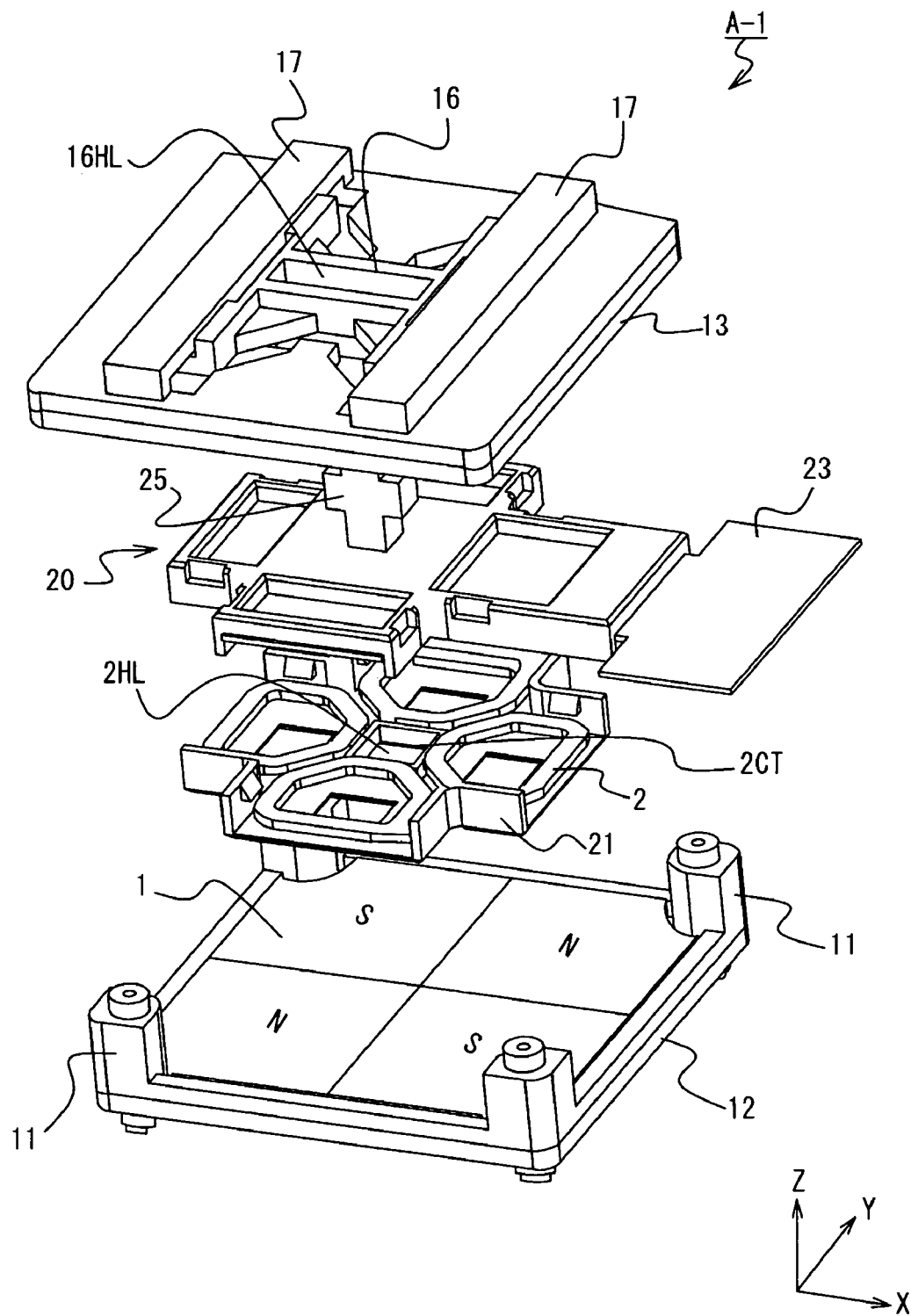
FIG. 4 is an exploded perspective view of an actuator of a first embodiment, seen from the top.
Figure 5:
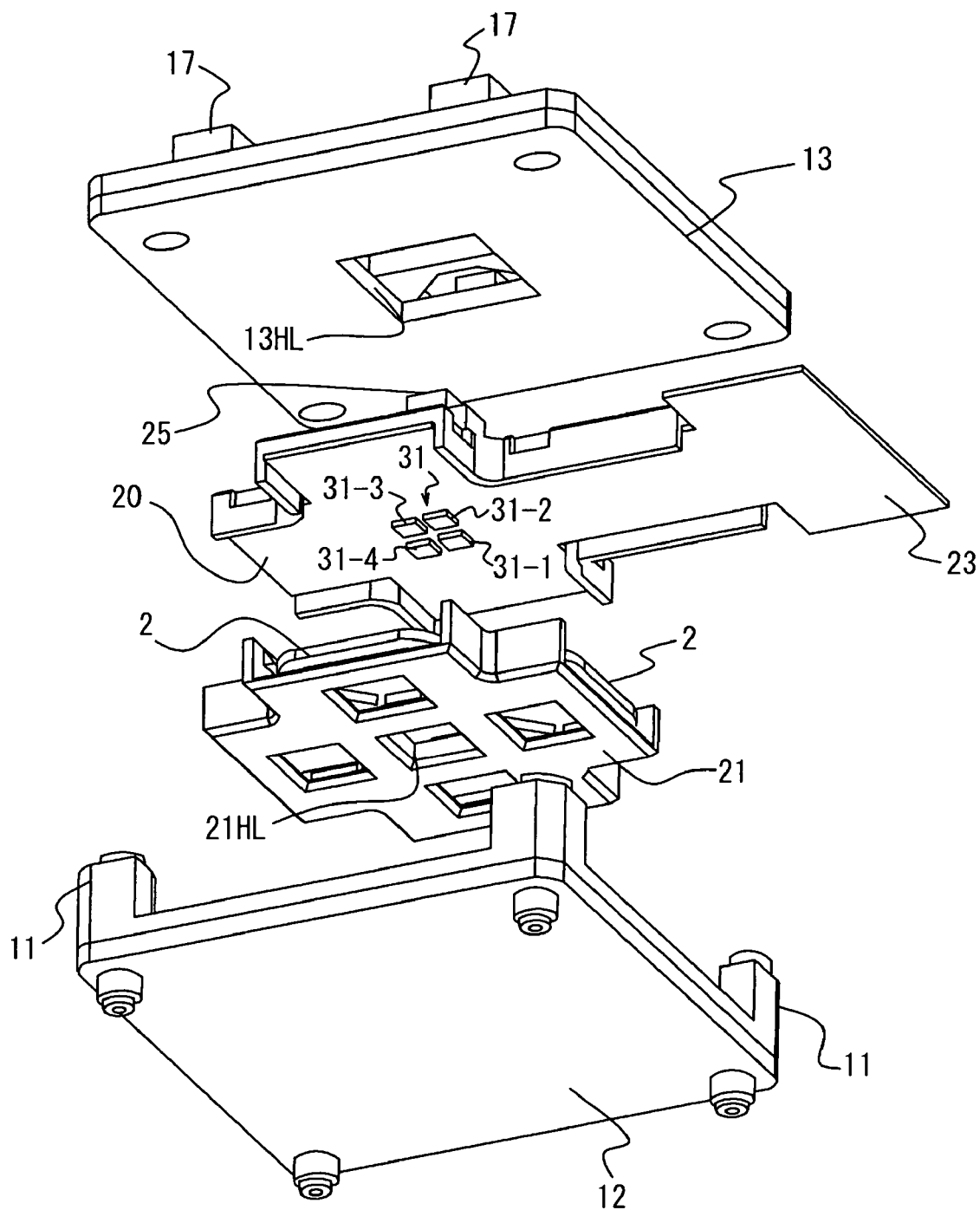
FIG. 5 is an exploded perspective view of the actuator of the first embodiment, seen from the bottom.
Figure 6:
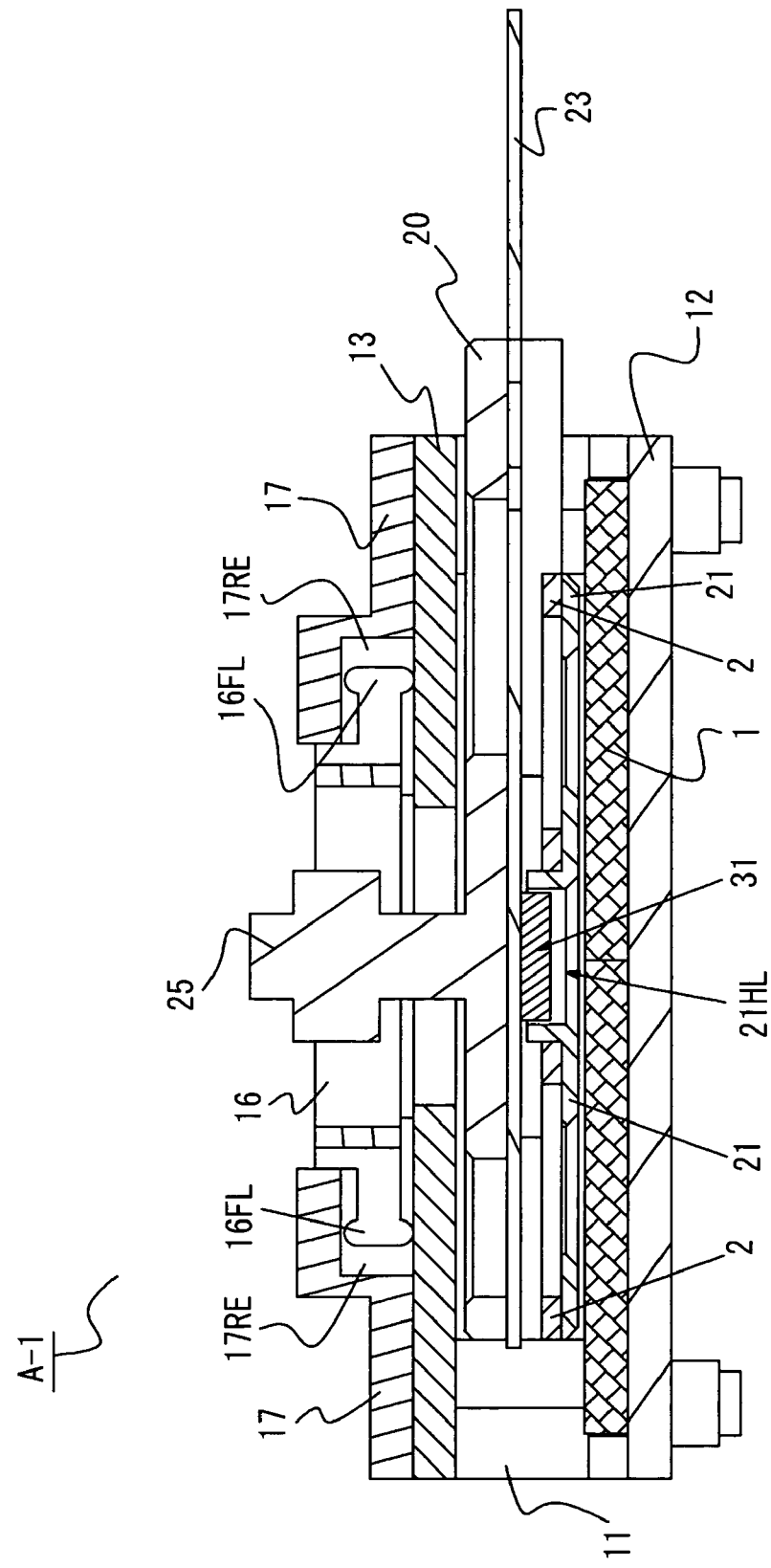
FIG. 6 is a section view of the actuator of the first embodiment, taken along the line extending in the X direction shown in FIG. 4.

FIGS. 4 through 6 illustrate an actuator A-1 in accordance with a first embodiment of the present invention. FIG. 4 is an exploded perspective view of the actuator A-1, seen from the top. FIG. 5 is an exploded perspective view of the actuator A-1, seen from the bottom. FIG. 6 is a section view of the actuator A-1, taken along the line extending in the X direction of FIG. 4. The actuator A-1 is produced in the form of a component to be incorporated into a device such as a mouse.

The actuator A-1 is formed on a lower yoke 12 that functions as a substrate. The same magnet unit as the magnet unit 1 shown in FIGS. 2A through 2C is placed directly on the lower yoke 12. However, the magnet unit 1 of this embodiment does not have an opening in the middle. Supporting pillars 11 that function as spacers and supporting members stand at the four corners of the lower yoke 12. The supporting pillars 11 create a predetermined space over the lower yoke 12, and an upper yoke 13 is placed over the predetermined space. A slider 20, to which the coils 2 are fixed, is movably accommodated in the space formed between the lower yoke 12 and the upper yoke 13. The slider 20 two-dimensionally moves upon receipt of a thrust force that is generated between the magnet unit 1 and the coils 2 when current is applied to the coils 2. A guide mechanism for moving the coils 2 within a predetermined two-dimensional region (in-plane) is formed on the upper yoke 13.

The slider 20 has the coils 2 held to the lower surface. More specifically, the coils 2 are secured to the lower surface of the slider 20 with a coil supporting member 21. An operation protrusion 25 is secured to the upper surface of the slider 20. The protrusion 25 is accommodated in an opening 13HL formed in the middle of the upper yoke 13 shown in FIG. 5. After the actuator A-1 is assembled, the protrusion 25 protrudes from the upper surface of the upper yoke 13, as shown in FIG. 6. The placement position of the protrusion 25 corresponds to the center position 2CT (see FIGS. 2A and 2B) of the coils 2 secured to the lower surface of the slider 20. Also, a circuit board 23 is engaged with the lower surface of the slider 20, and is interposed between the slider 20 and the coils 2. Electric parts (not shown) are mounted to the circuit board 23 to form a predetermined circuit pattern.

A mechanism for moving the slider 20 within a predetermined two-dimensional region is formed in the upper yoke 13. More specifically, in the actuator A-1 of this embodiment, the protrusion 25 that moves with the slider 20 is engaged with guide members, so as to move within a predetermined two-dimensional region.

The actuator A-1 includes a first guide unit 16 and a second guide unit 17 that guide the protrusion 25 in the X direction and the Y direction, respectively. As can be seen from FIG. 4, the first guide unit 16 guides the protrusion 25 in the X direction within a predetermined range. The first guide unit 16 has a rectangular opening 16HL in the middle. The first guide unit 16 accommodates the protrusion 25 in the opening 16HL, and guides the protrusion 25 in the X direction.

The first guide unit 16 is guided in the Y direction, which is perpendicular to the X direction, by the second guide unit 17. The second guide unit 17 includes a pair of guide members that guide the first guide unit 16 back and forth in the Y direction. As shown in FIG. 6, the first guide unit 16 has a flange unit 16FL that protrudes from both sides of the first guide unit 16. The flange unit 16FL is engaged with receiving grooves 17RE that are formed in the inner walls of the pair of guide members that form the second guide unit 17. The receiving grooves 17RE extend in the Y direction. Accordingly, the first guide unit 16 slides in one direction (in the Y direction) along the inner surfaces of the second guide unit 17.

In the above described structure, the protrusion 25 is guided in the X direction by the first guide unit 16, and the first guide unit 16 is guided in the Y direction, which is perpendicular to the X direction, by the second guide unit 17. In this actuator, when the slider 20 having the coils 2 secured thereto receives a predetermined thrust force, the protrusion 25 can freely move within a guided two-dimensional region. Although not shown in the drawings, the protrusion 25 that is set in the first guide unit 16 slidably moves in the X direction and is held so as not to drop down. Accordingly, the slider 20 is supported by the upper yoke 13 through the protrusion 25 and the first guide unit 16.

The actuator A-1 having the above described structure is incorporated into a device, such as a mouse, in such a manner that an operator can touch the protrusion with a finger. In this manner, the operator can feel the thrust force generated from the coils 2 secured to the slider 20. If the current to be applied to the coils 2 is controlled to move the slider 20 in a vibratory manner, the operator can recognize that the protrusion 25 is vibrating. Accordingly, the actuator A-1 incorporated into a mouse can transmit information from the computer side to the operator side through vibration.

However, a mouse is originally a device for inputting instructions from an operator. In view of this, the actuator A-1 of this embodiment is designed to serve also as an input device when incorporated into a mouse. While having a structure for moving in-plane as described above, the actuator A-1 is designed to perform accurate coordinate input. In the following, this aspect of the actuator A-1 will be described in greater detail. When the actuator A-1 is incorporated into a mouse, an operator moves the protrusion 25 to input an instruction. In view of this, the actuator A-1 is equipped with a position detecting structure for detecting precise movement of the protrusion 25. Although it is possible to employ LEDs and photodiodes (PDs) to optically detect movement of the protrusion 25, Hall elements that are electromagnetic conversion elements are employed to perform position detection. With the Hall elements, the costs can be lowered, and accurate position detection can be performed, without disturbance that is normally caused in optical detection.

In the actuator A-1 of the first embodiment, the Hall elements, which are placed on the slider 20 as the coil holder, detects the magnetic field of the magnet unit 1 that serves as the magnetic field generator. Based on output signals from the Hall elements, the actuator A-1 performs coordinate output. As shown in FIG. 5, a Hall element unit 31 is placed under the lower surface of the slider 20. As shown in FIG. 6, the Hall element unit 31 is located in the position corresponding to the center position of the four magnetic poles in the initial state after the assembly.

The coils 2 secured to the slider 20 have the space 2CT in the middle. The coil supporting member 21 has an opening 21HL corresponding to the space 2CT. After the actuator A-1 is assembled, the Hall element unit 31 is accommodated in the space 2CT, and faces a position detecting magnet 1 through the opening 21HL, as shown in FIG. 6. The Hall element unit 31 includes four Hall elements 31-1 through 31-4, each two of which are aligned in the X and Y directions that are perpendicular to each other. It is possible to provide one element in each direction so as to detect movement of the magnet unit 1 and the slider 20. In this actuator A-1, however, two Hall elements are provided in each direction, so that differential detection is performed to achieve highly accurate position detection.

When an operator moves the protrusion 25 of the actuator A-1 of the first embodiment shown in FIGS. 4 through 6, the four Hall elements 31-1 through 31-4 detect a change in the electric field generated from the four magnetic poles of the magnet unit 1. Accordingly, the Hall elements 31-1 through 31-4 detect movement of the protrusion 25, and perform coordinate input using the detection signal.

Figure 7:
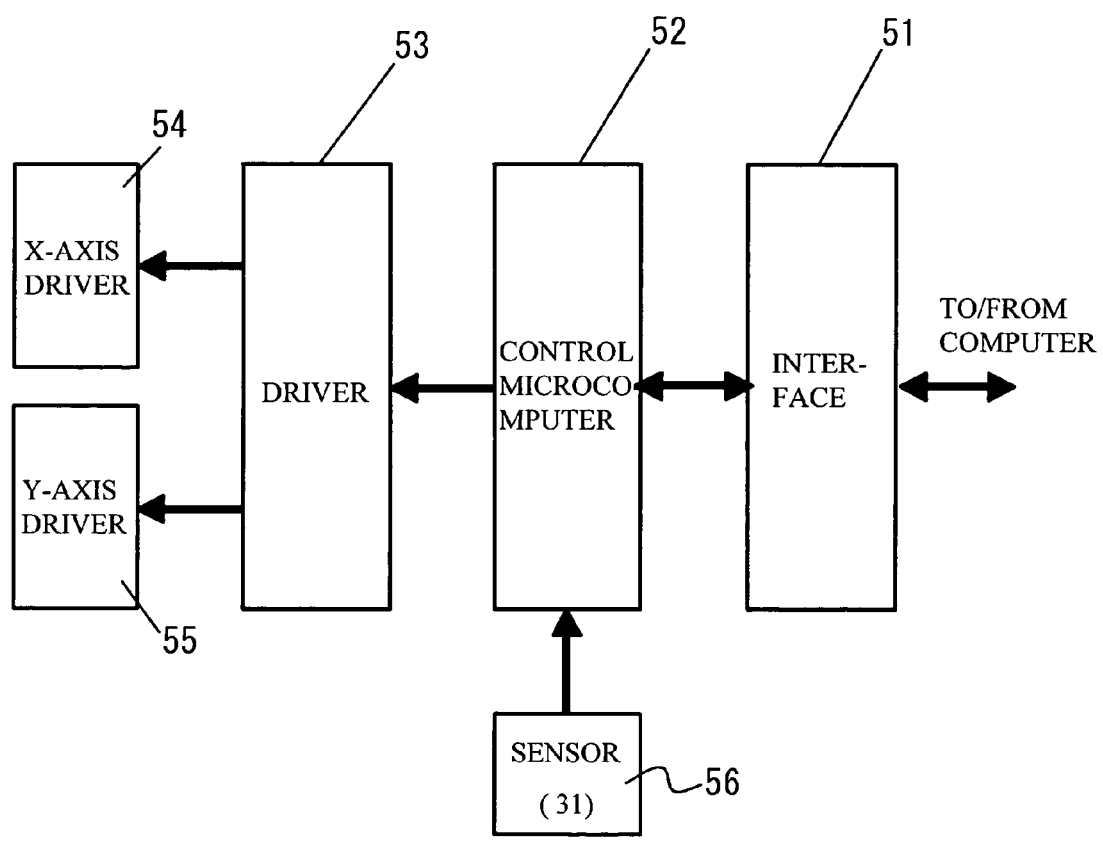
FIG. 7 is a block diagram schematically showing the structure of the actuator of the first embodiment.

FIG. 7 is a block diagram schematically illustrating the structure of the actuator A-1. In this structure, parts such as a CPU placed on the circuit substrate 23 (see FIGS. 4 and 5) form a control microcomputer unit 52. The control microcomputer unit 52 controls the current to be applied to the coils 2. Also, the control microcomputer unit 52 is connected to an external apparatus such as a computer via an interface unit 51. Based on signals supplied from the computer, the control microcomputer unit 52 supplies drive signals to a driver unit 53. Upon receipt of a drive signal, the driver unit 53 adjusts current to be supplied to an X-axis driving unit 54 and a Y-axis driving unit 55. The X-axis driving unit 54 and the Y-axis driving unit 55 are equivalent to the coils 2. Thus, the control microcomputer unit 52 controls the current to be supplied to the X-axis driving unit 54 and the Y-axis driving unit 55, so as to move the slider 20 in a desired manner. As a result, the protrusion 25 that moves with the slider 20 vibrates, so that various kinds of information can be transmitted to operators through movement of the protrusion 25. In a case where the actuator A-1 is incorporated into a device such as a mouse, components such as the CPU of the device may serve as the control microcomputer unit 52.

As described earlier, the actuator A-1 is also designed to function as an input device. As an input device, the actuator A-1 can perform coordinate position input on the display of a connected computer, when an operator moves the protrusion 25 with a finger. In that case, a detection signal generated from the Hall element unit 31 facing the magnet unit 1 is utilized. Detection signals generated from the Hall element unit 31 and a sensor unit 56 that includes other sensors, are supplied to the control microcomputer unit 52, and are then processed. When receiving a detection signal from a Hall element unit 31, for example, the control microcomputer unit 52 performs a predetermined operation to perform coordinate output, and then outputs coordinate data to the computer via the interface unit 51.

Second Embodiment

Figure 8C:
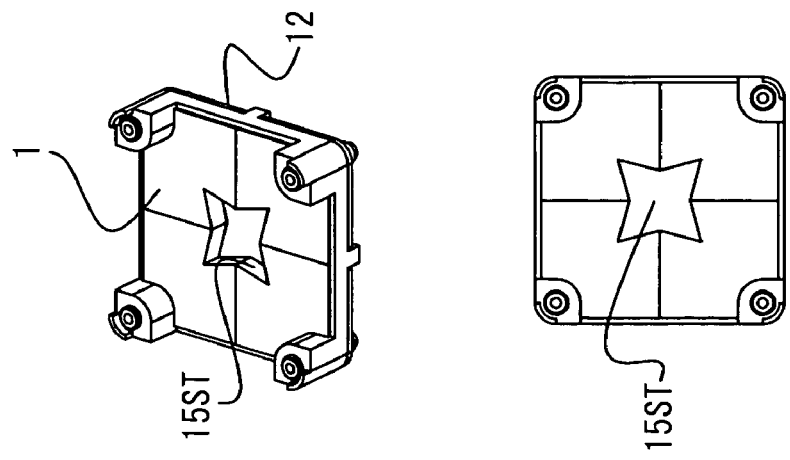
FIGS. 8A through 8C are perspective views and plan views each showing the lower yoke and the magnet unit of an actuator in accordance with a second embodiment of the present invention.
Figure 8B:
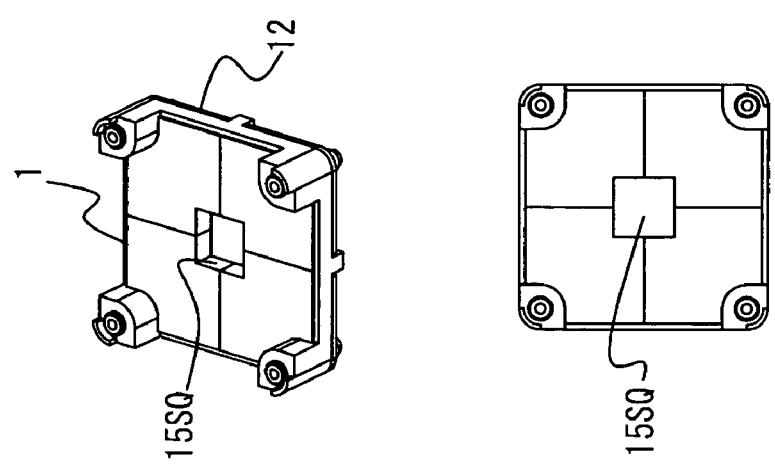
Figure 8A:
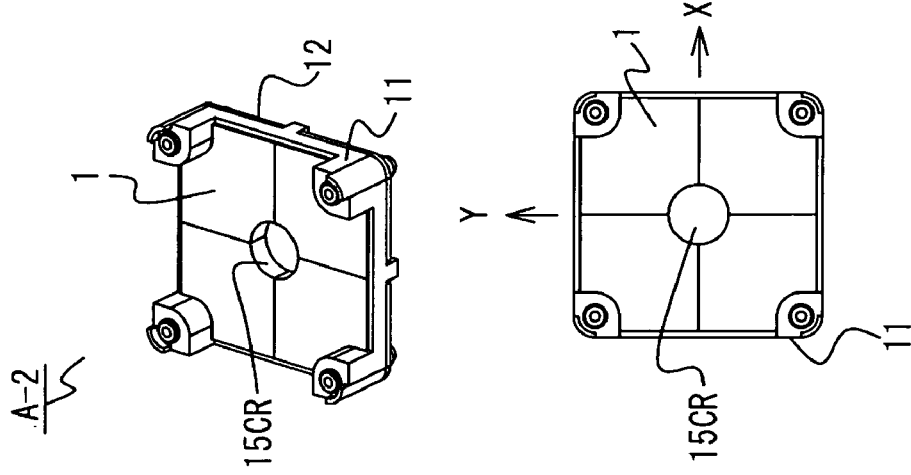

FIGS. 8A through 9D illustrate an actuator in accordance with a second embodiment of the present invention. In this embodiment, the magnet unit 1 of the first embodiment is modified to improve the functions of the actuator. The lower yoke 12 and the magnet unit 1 placed thereon are shown in the drawings to clearly illustrate the difference between the first embodiment and the second embodiment. FIGS. 8A through 8C are perspective views and plan views each illustrating the lower yoke and the magnet unit of the actuator A-2 in accordance with the second embodiment. In these drawings, the same components as those of the first embodiment are denoted by the same reference numerals as those in FIGS. 4 through 6, and explanation of them is omitted herein. The same applies to all embodiments that will follow this embodiment.

The magnet unit 1 of the actuator A-2 of the second embodiment has an opening 15 in the middle of the four magnetic poles. When the magnet unit 1 and the slider 20 are located in the initial positions, the Hall element unit 31 is located to face the opening 15. In the actuator A-2, the magnet unit 1 in the initial position is not located to face the Hall element unit 31, and the Hall elements 31-1 through 31-4 do not face the magnetic poles. The formation of the opening 15 in the magnet unit 1 smoothes the distribution of the magnetic field generated from the magnetic poles of the magnet unit 1 (or restricts distortion of the flux density distribution). Thus, the Hall elements 31-1 through 31-4 can detect movement of the magnet unit 1 and the slider 20 to perform accurate coordinate output.

FIG. 8A shows a case where the opening 15 is a circular opening 15CR. FIG. 8B shows a case where the opening 15 is a square opening 15SQ. FIG. 8C shows a case where the opening 15 is a star-shaped opening 15ST, with pointed parts being radially arranged. Each opening 15 is axisymmetrical about the X axis and the Y axis. With such an opening 15 being provided in the magnet unit 1, movement of the protrusion 25 can be detected with precision. Accordingly, movement of the protrusion 25, moved by an operator, can be detected with precision, and accurate coordinate input can be performed.

Figure 9A:
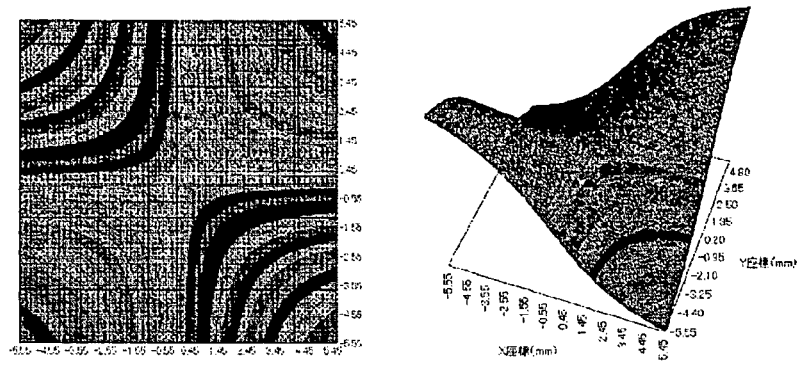
FIGS. 9A through 9D illustrate changes in the magnetic field distribution where the shape of the opening in the magnet is varied.
Figure 9B:
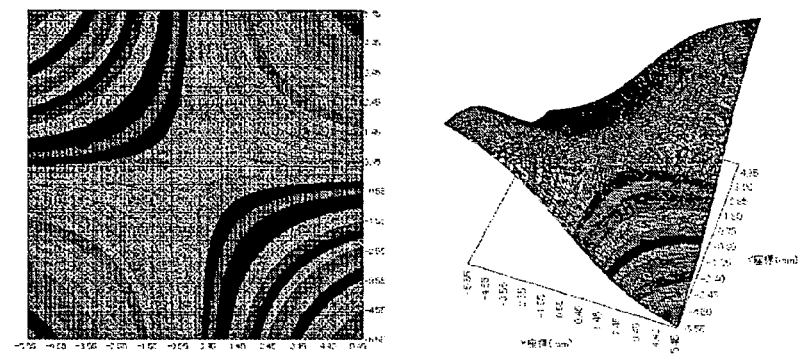
Figure 9C:
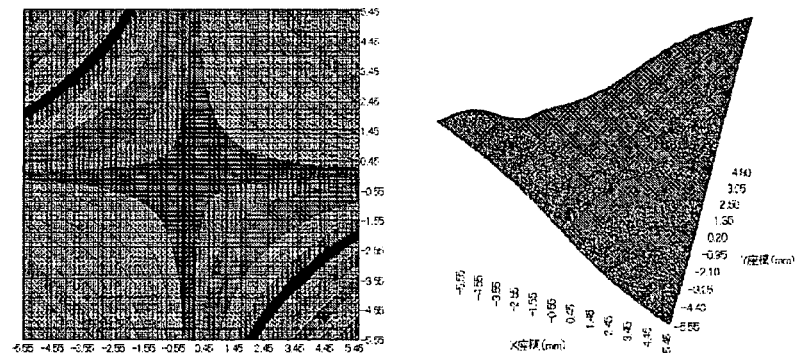
Figure 9D:
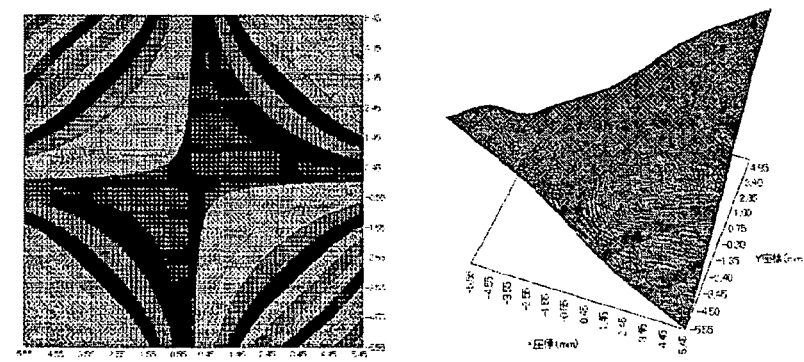

FIGS. 9A through 9D illustrate changes of the magnetic field distribution when the shape of the opening in the magnet unit 1 is changed. FIG. 9A shows the magnetic field distribution in a case where the magnet unit 1 does not have an opening 15. FIG. 9B shows the magnetic field distribution in a case of the circular opening 15CR of FIG. 8A. FIG. 9C shows the magnetic field distribution in a case of the square opening 15SQ of FIG. 8B. FIG. 9D shows the magnetic field distribution in a case of the star-shaped opening 15ST of FIG. 8C. As can be seen from the drawings, each opening 15 loosens the distribution curve, and smoothes the distribution of the magnetic flux density. As is apparent from FIG. 9A through FIG. 9D, the smoothness in the density distribution becomes greatest in FIG. 9D.

The size (the area) of the opening 15 should preferably be equivalent to 80% to 120% of the region in which the Hall element unit 31 (and the protrusion 25) can move relative to the magnet unit 1 on the fixed side. If the opening 15 is too small, the linearity of the density distribution of the magnetic flux generated from the magnet unit 1 becomes poorer. If the opening 15 is too large, it becomes difficult to obtain a thrust force as the driving force from the magnet unit 1. On the other hand, if the size of the opening 15 is restricted within the predetermined range, the linearity of the density distribution of the magnetic flux generated from the magnet unit 1 can be maintained at a satisfactory level, and the thrust force as the driving force can be obtained from the magnet unit 1.

As described above, distortion of the magnetic field to be detected can be corrected simply by forming the opening 15 in the magnet unit 1 in the actuator A-2 of the second embodiment. The corrected magnetic field can be position-detected by the Hall element unit 31. Thus, movement of the protrusion 25 moved by an operator can be detected with precision, and accurate coordinate input can be performed.

Third Embodiment

Figure 10C:
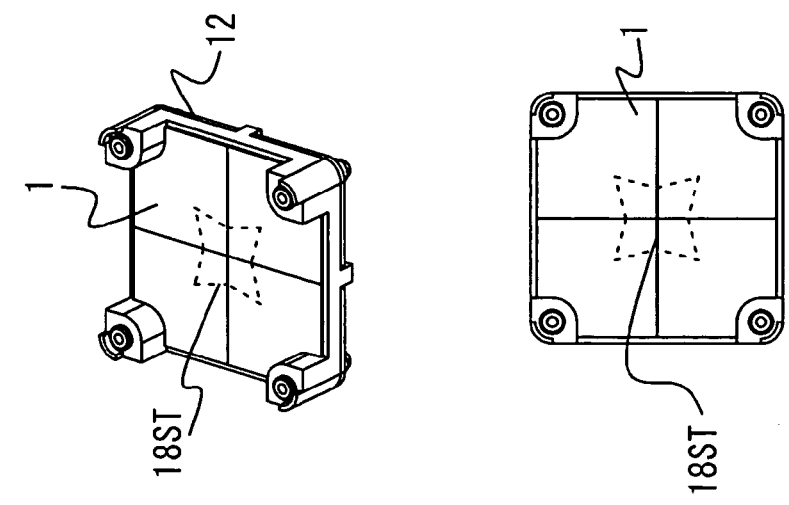
FIGS. 10A through 10C are perspective views and plan views each showing the lower yoke and the magnet unit of an actuator in accordance with a third embodiment of the present invention.
Figure 10B:
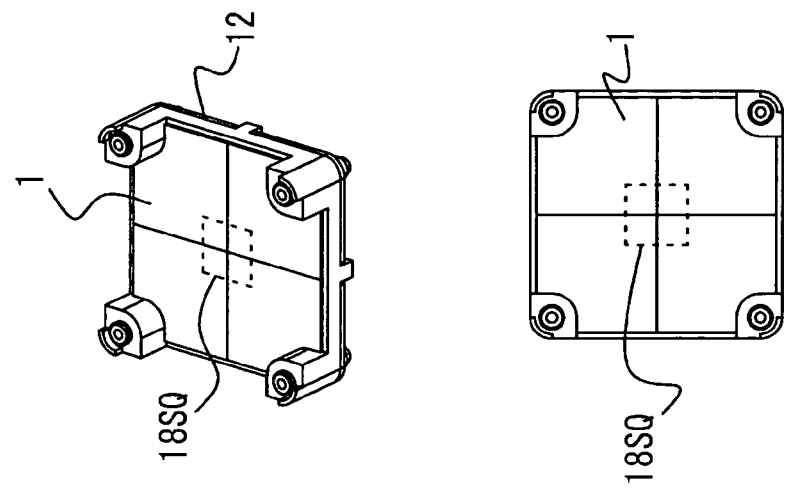
Figure 10A:
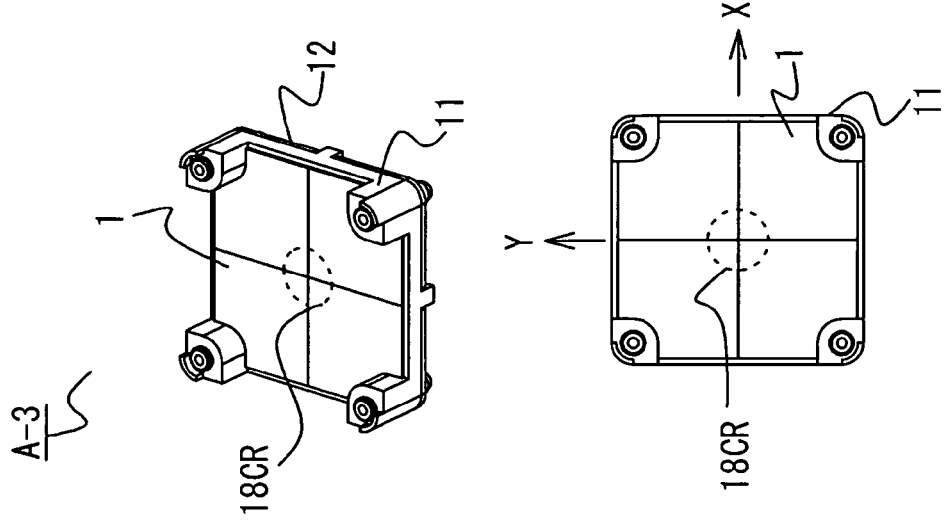

FIGS. 10A through 10C illustrate an actuator in accordance with a third embodiment of the present invention. In this embodiment, the magnet unit 1 of the first embodiment is also modified to improve the functions of the actuator. The lower yoke 12 and the magnet unit 1 placed thereon are shown in the drawings to clearly illustrate the difference between the first embodiment and the third embodiment. FIGS. 10A through 10C are perspective views and plan views each showing the lower yoke and the magnet unit of an actuator A-3 of the third embodiment. The magnet unit 1 of the actuator A-3 has a non-magnetic region 18 in the middle of the four magnetic poles. The non-magnetic region 18 has the same shape as the opening 15 of the second embodiment. The formation of the non-magnetic region 18 corresponding to the opening 15 in the magnet unit 1 can also smooth the distribution of the magnetic flux density of the magnet unit 1.

The magnet unit 1 of the actuator A-3 of the third embodiment has the non-magnetic region 18 in the middle of the four magnetic poles. When the magnet unit 1 and the slider 20 are in the initial positions, the Hall element unit 31 is located to face the non-magnetic region 18. Accordingly, when the actuator A-3 is in the initial state, the part of the magnet unit 1 facing the Hall element unit 31 is not magnetic. Thus, the Hall elements 31-1 through 31-4 of the actuator A-3 do not face the magnetic poles, and the same effects as the case of the opening 15 can be obtained.

FIG. 10A shows a case where the non-magnetic region 18 is a circular region 18CR. FIG. 10B shows a case where the non-magnetic region 18 is a square region 18SQ. FIG. 10C shows a case where the non-magnetic region 18 is a star-shaped region 18ST. Each non-magnetic region 18 is axisymmetrical about the X axis and the Y axis. With such a non-magnetic region 18 being provided in the magnet unit 1, accurate position detection can be performed by the Hall element unit 31, as in the case of the opening 15. Accordingly, movement of the protrusion 25, moved by an operator, can be detected with precision, and accurate coordinate input can be performed. The size (the area) of the non-magnetic region 18 should also be equivalent to 80% to 120% of the region in which the Hall element unit 31 (and the protrusion 25) can move relative to the magnet unit 1 on the fixed side.

Fourth Embodiment

Figure 11:
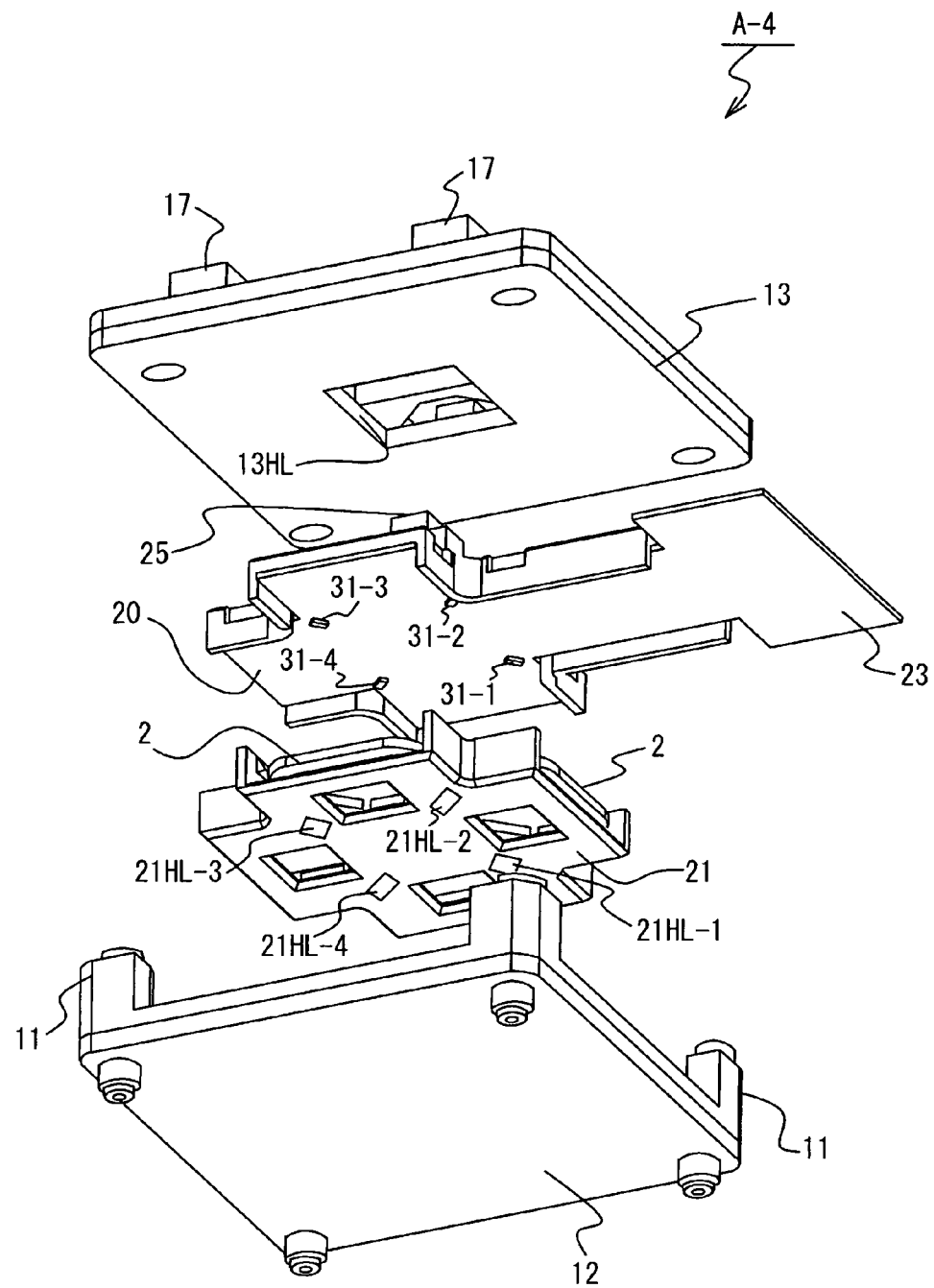
FIG. 11 is an exploded perspective view of the structure of an actuator in accordance with a fourth embodiment of the present invention, seen from the bottom.

FIG. 11 is an exploded perspective view of an actuator A-4 in accordance with a fourth embodiment, seen from the bottom. In the actuator A-4 of this embodiment, the four Hall elements 31-1 through 31-4 are located at a distance from one another, and face the spot that is equivalent to the middle of the four magnetic poles of the magnet unit 1. The arrangement of the four magnetic poles of the magnet unit 1 is the same as the arrangement of the first embodiment shown in FIG. 4.

Figure 12:
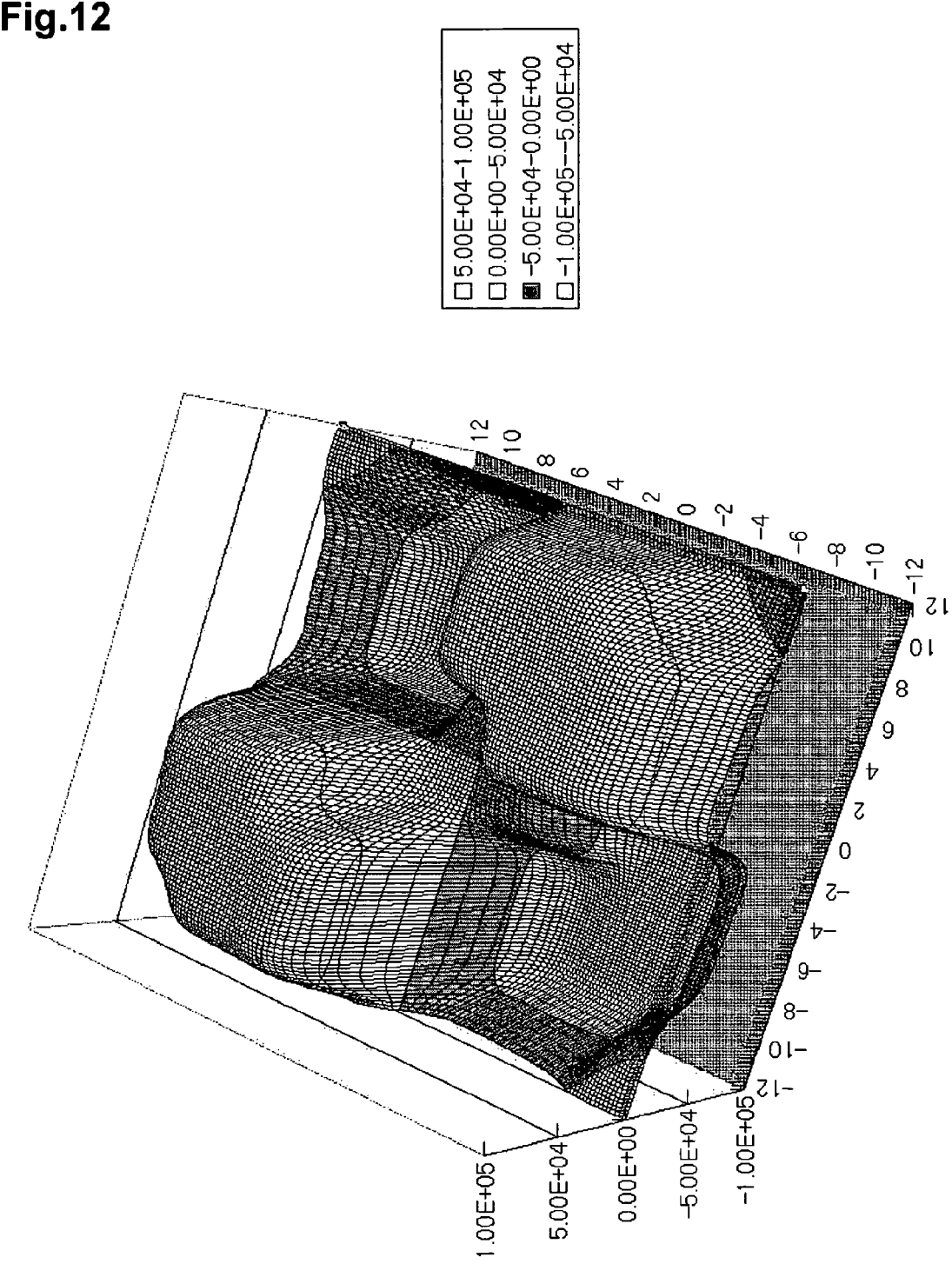
FIG. 12 illustrates the distribution of the vertical magnetic field intensity of the four magnetic poles of the magnet unit.

FIG. 12 shows the distribution of the intensity of the vertical magnetic field generated from the four magnetic poles of the magnet unit 1. The vertical magnetic field extends in the Z-axis direction (the vertical direction that is perpendicular to the X axis and the Y axis). As can be seen from FIG. 12, the central area of each magnetic pole (North or South pole) has the largest intensity value. In this structure, the Hall elements 31-1 through 31-4 are arranged at a distance from one another, so that movement of the protrusion 25 can be detected from a change in the magnetic field. In this embodiment, the magnet unit 1 may or may not have an opening in the middle. Movement of the protrusion 25 can be detected with precision, and accurate coordinate input can also be performed in this embodiment.

Fifth Embodiment

Figure 13:
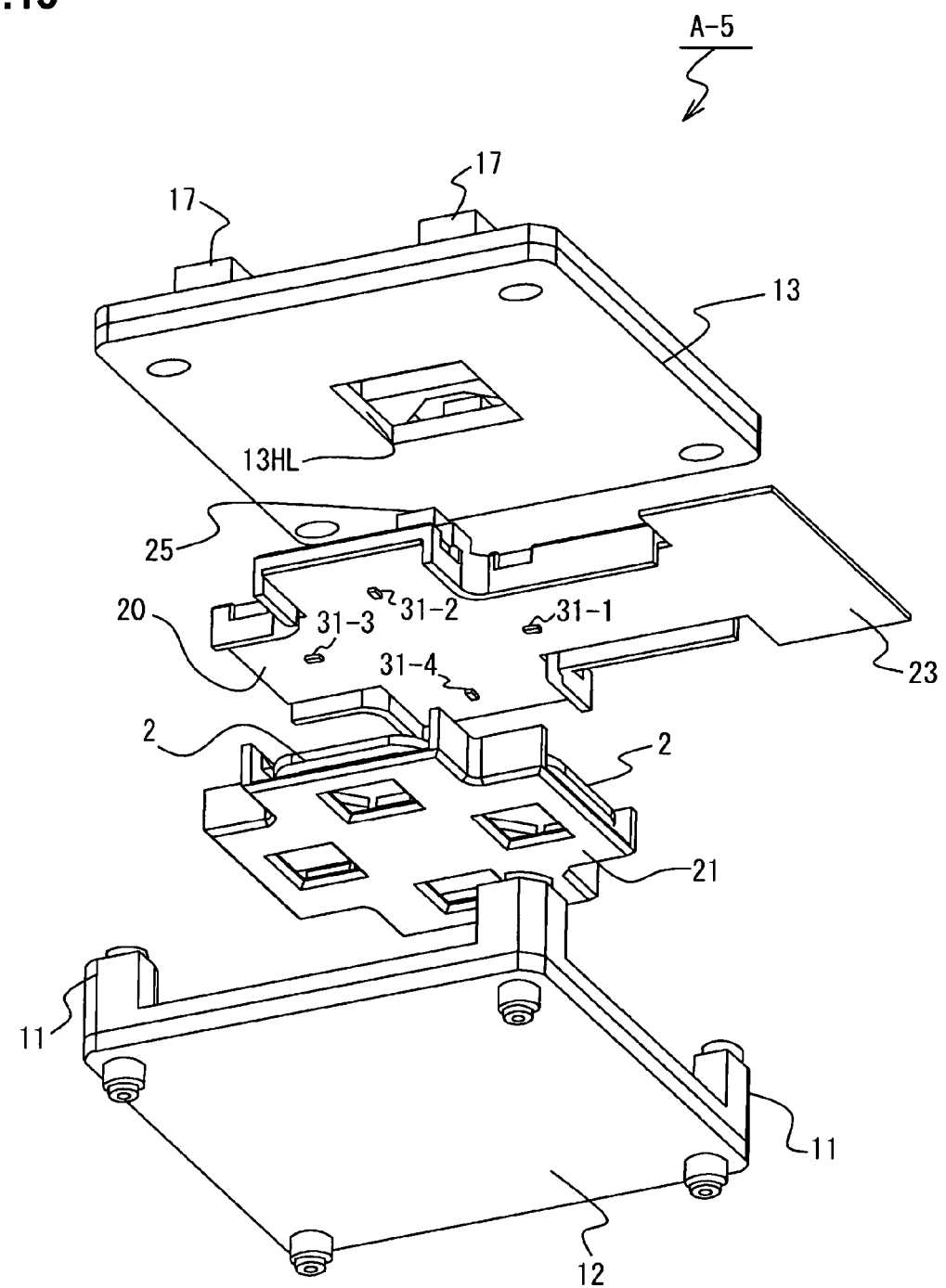
FIG. 13 is an exploded perspective view of an actuator in accordance with a fifth embodiment of the present invention, seen from the bottom.

FIG. 13 is an exploded perspective view of an actuator A-5 in accordance with a fifth embodiment of the present invention, seen from the bottom. In the actuator A-5 of this embodiment, the four Hall elements 31-1 through 31-4 are arranged at a distance from one another, as in the fourth embodiment. In this embodiment, however, the Hall elements 31-1 through 31-4 are arranged so that each of the Hall elements 31-1 through 31-4 faces the boundary between each two corresponding neighboring magnetic poles among the four magnetic poles of the magnet unit 1.

Figure 14A:
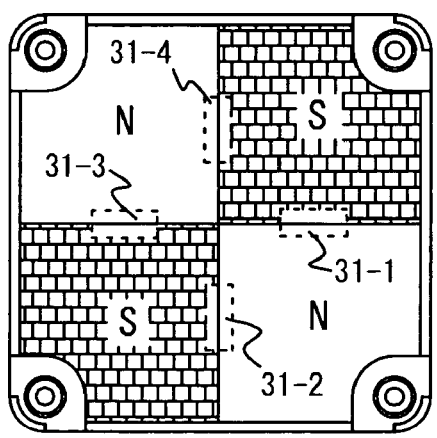
FIGS. 14A and 14B are plan views each showing the lower yoke and the magnet unit, particularly illustrating the arrangement of the Hall elements shown in FIG. 13.
Figure 14B:
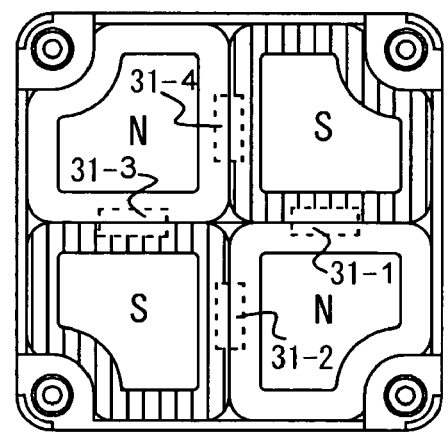

As already shown in FIG. 12, the magnetic field intensity rapidly changes at the boundary between each two different magnetic poles (between a South pole and a North pole). In this embodiment, movement of the protrusion 25 at the boundaries is detected by the Hall elements. Therefore, the four Hall elements are arranged at the four boundaries existing in the magnet unit 1, so as to detect movement of the protrusion 25. FIGS. 14A and 14B are plan views each showing the lower yoke 12 and the magnet unit 1 of the actuator A-5 of this embodiment in such a manner that the location of each Hall element can be easily recognized. FIG. 14A shows a case where the magnet unit 1 is a permanent magnet unit, with each Hall element being located between a North pole and a South pole. FIG. 14B shows a case where the magnet unit 1 is an electromagnet unit that is formed by coils, with each Hall element being located between each corresponding two neighboring coils. In this embodiment, movement of the protrusion 25 can be detected with precision, and accurate coordinate input can be performed. Also, the magnet unit 1 of this embodiment may or may not have an opening in the middle.

Sixth Embodiment

Figure 15:
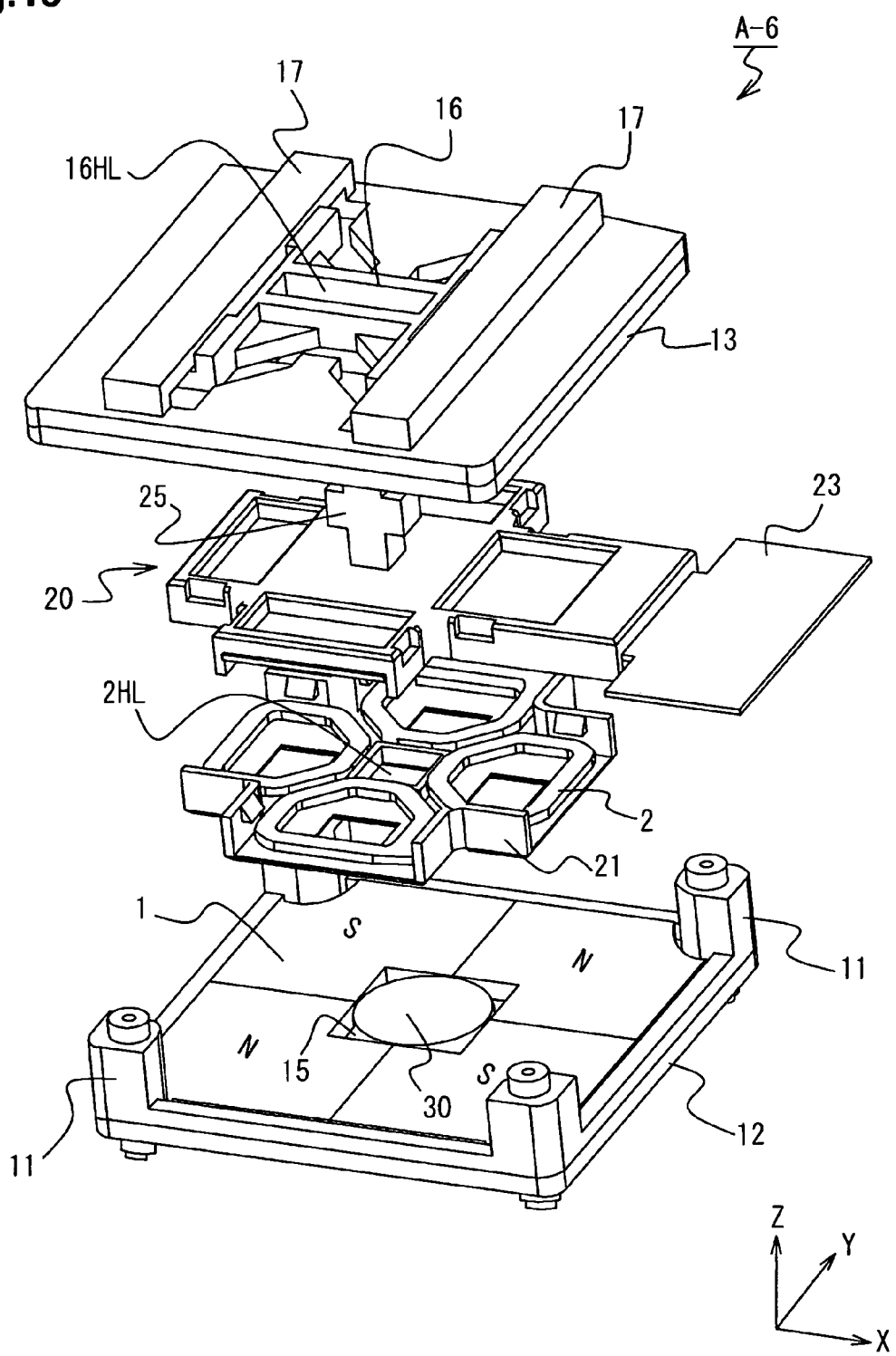
FIG. 15 is an exploded perspective view of an actuator in accordance with a sixth embodiment of the present invention, seen from the top.
Figure 16:
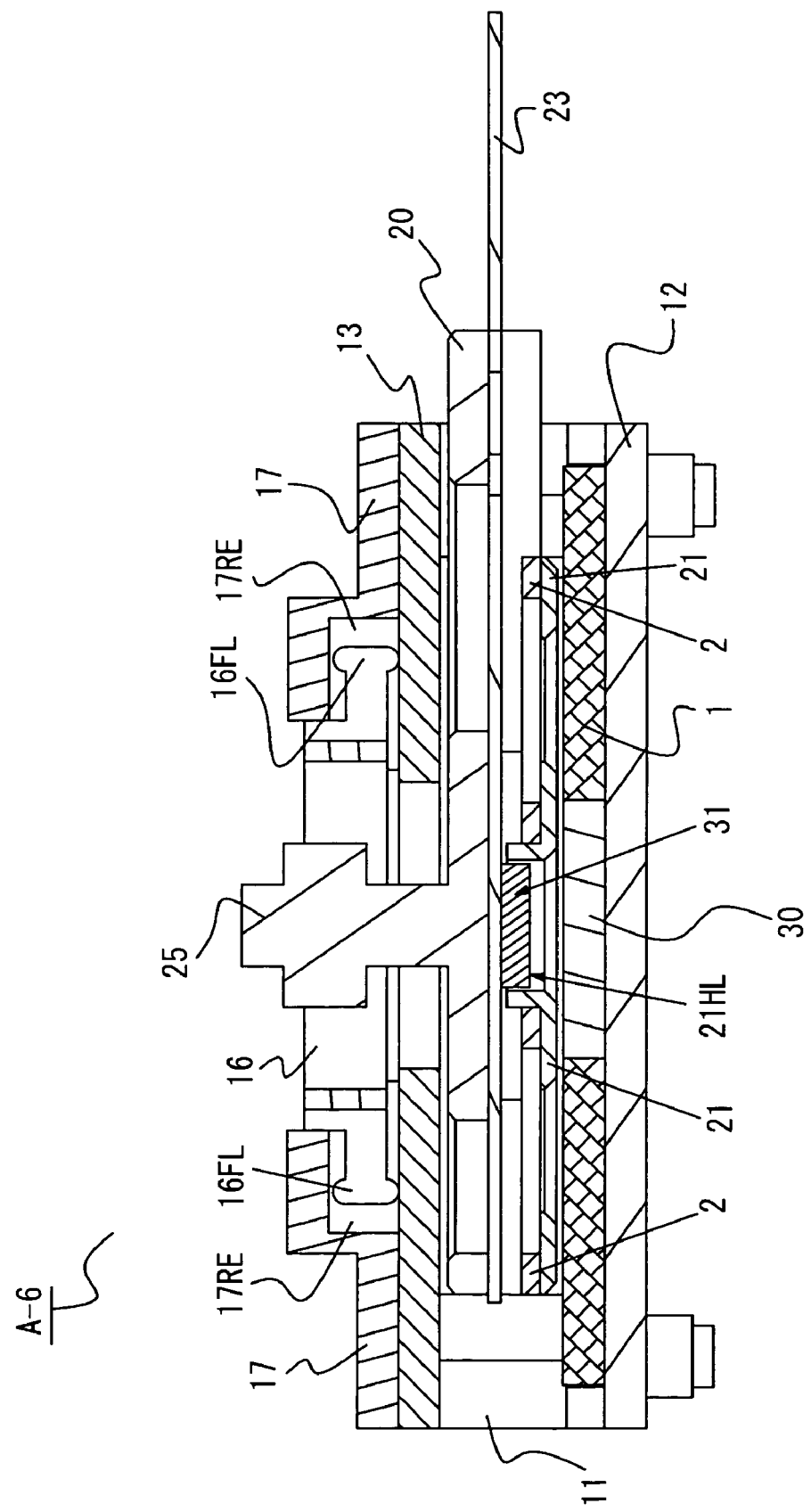
FIG. 16 is a section view of the actuator of FIG. 15, taken along the line extending in the X direction.
Figure 17:
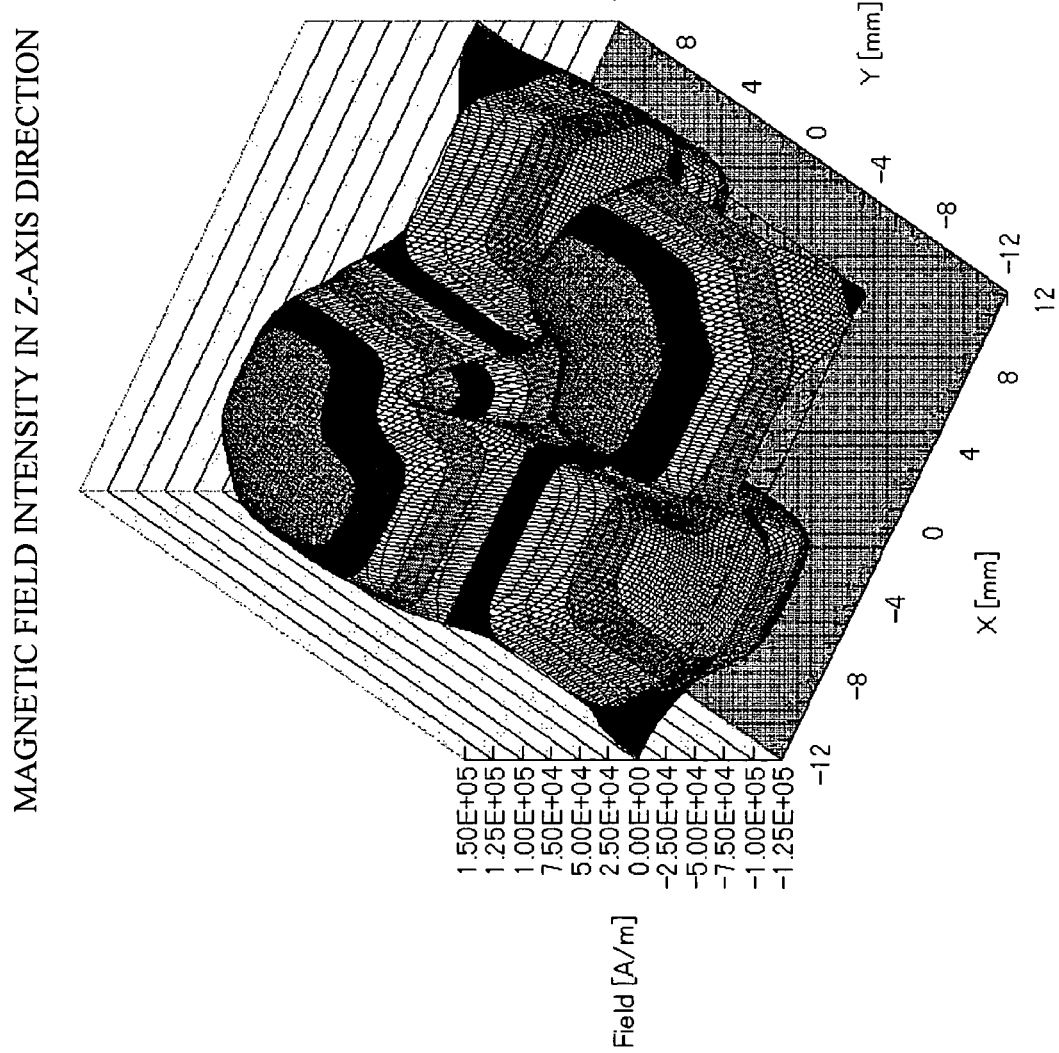
FIG. 17 illustrates the distribution of the vertical magnetic field intensity of the magnet unit in the actuator in accordance with the sixth embodiment.

FIGS. 15 through 17 illustrate an actuator A-6 in accordance with a sixth embodiment of the present invention. FIG. 15 is an exploded perspective view of the actuator A-6, seen from the top. FIG. 16 is a section view of the actuator A-6, taken along the line extending in the X direction of FIG. 15. FIG. 17 shows the distribution of the magnetic field intensity of the magnet unit 1 of the actuator A-6 in the Z-axis direction (the direction perpendicular to the X and Y axes). As mentioned earlier, the same components as those of the first embodiment are denoted by the same reference numerals as those in FIGS. 4 through 6.

The actuator A-6 of this embodiment differs from each actuator of the foregoing embodiments in having a position detecting magnet and detecting the position detecting magnet with the Hall element unit 31 (see FIG. 5). Therefore, the actuator A-6 of this embodiment has a position detecting magnet 30 in the magnet unit 1 that serves as the magnetic field generator. Meanwhile, the Hall element unit 31 is placed in such a position on the slider 20 as to face the position detecting magnet 30. The slider 20 holds the coils 2 and serves as the coil holder. As shown in FIGS. 15 and 16, the position detecting magnet 30 is placed in the opening 15 formed in the middle of the magnet unit 1 of this embodiment. With the magnet 30 specifically employed for position detection, more accurate detection can be performed by the Hall element unit 31. More specifically, the opening 15 that has been described in the foregoing embodiments is formed in the center position of the magnet unit 1 for driving, and the position detecting magnet 30 is simply placed in the opening 15 in this embodiment. Accordingly, the addition of the position detecting magnet 30 does not increase the external size of the actuator A-6.

FIG. 17 shows the distribution of the magnetic field intensity in the Z-axis direction, with the position detecting magnet 30 being placed in the middle of the four magnetic poles of the magnet unit 1. As is apparent from a comparison with the distribution shown in FIG. 12, the magnetic field exhibits a very high intensity in the middle, due to the position detecting magnet 30. In this embodiment, the Hall element unit 31 detects the magnetic field with the very high intensity, and accurately detects movement of the protrusion 25, accordingly. In this embodiment, the position detecting magnet 30 is placed in the magnet unit 1, while the Hall element unit 31 is mounted to the slider 20 so as to face the position detecting magnet 30. However, the locations of the position detecting magnet 30 and the Hall element unit 31 may be reversed. More specifically, the same effects can be obtained from a structure in which the position detecting magnet 30 is placed on the slider 20 while the Hall element unit 31 is placed in the magnet unit 1 so as to face the position detecting magnet 30.

Seventh Embodiment

Figure 18:
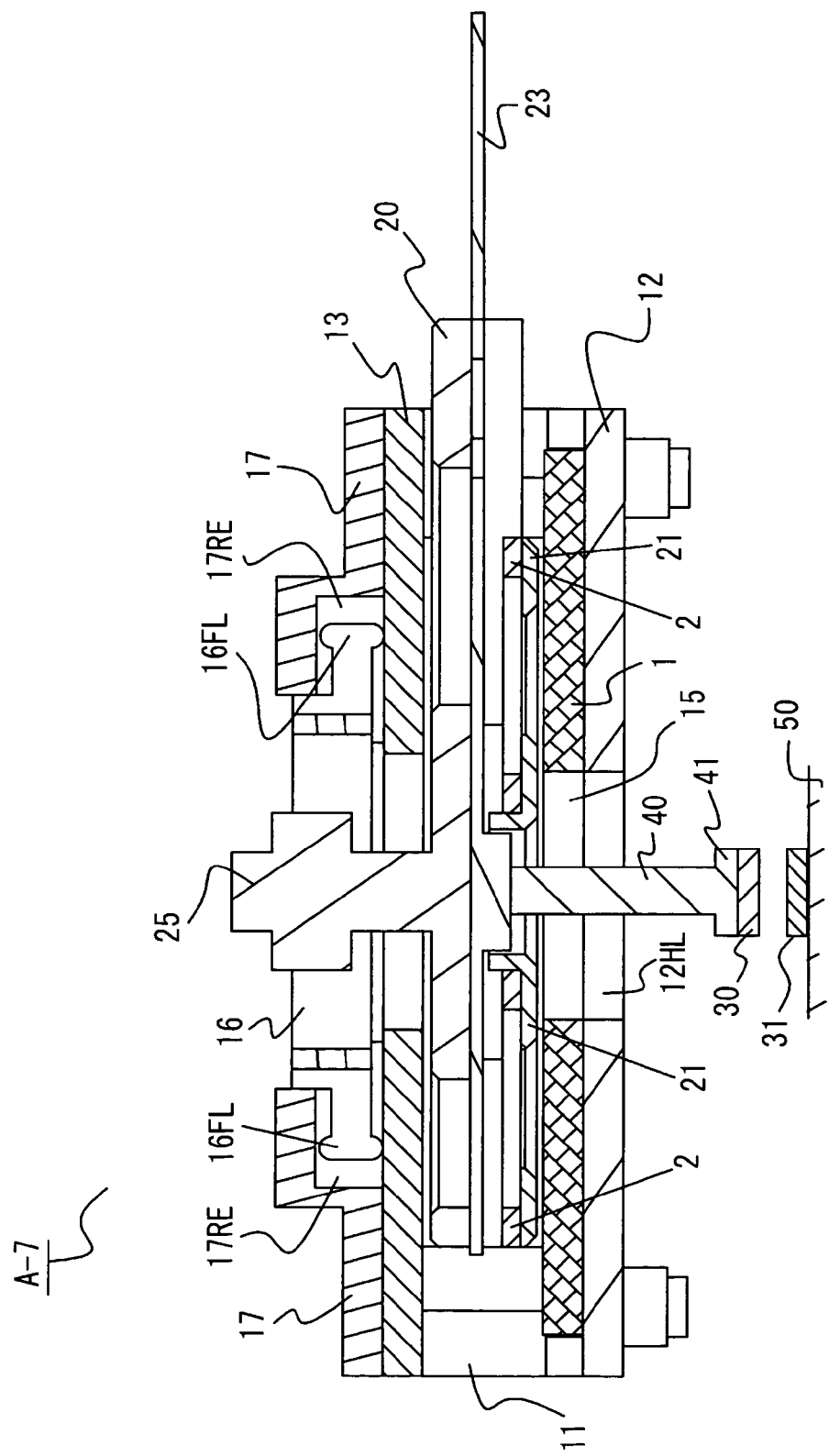
FIG. 18 is a section view of an actuator in accordance with a seventh embodiment of the present invention.

FIG. 18 is a section view of an actuator A-7 in accordance with a seventh embodiment of the present invention. In the first through sixth embodiments, a magnetic field generated in the upper yoke 12 and the lower yoke 13 is detected by the Hall elements. In the seventh embodiment, however, a position detecting magnet is provided outside the yokes, and the Hall elements are arranged to face the position detecting magnet so as to detect relative motion between the magnet unit 1 and the slider 20. The position detecting magnet provided outside the yokes is not adversely affected by a strong magnetic field generated in the yokes when current is applied to the coils. Accordingly, precise position detection can be performed by the Hall elements.

As shown in FIG. 18, the actuator A-7 has an arm 40 that hangs down from the lower surface of the slider 20. The arm 40 penetrates the lower yoke 12, and the end portion 41 of the arm 40 is located outside the yokes 12 and 13. The location of the end portion 41 is set in such a position as to effectively reduce adverse influence of a magnetic field generated in the yokes 12 and 13. In this embodiment, a through hole is formed in the center of magnet unit 1 and the center of the lower yoke 12. The through hole formed in the magnet unit 1 may be the opening 15 (see FIGS. 8A through 8C). The lower yoke 12 has a through hole 12HL. The through holes 12HL and 15 are large enough to allow the slider 20 to move, and, at the same time, are small enough to avoid interference with the arm 40.

The position detecting magnet 30 is secured to the end portion 41. The Hall element unit 31 is placed on a substrate 50 so as to face the position detecting magnet 30. The substrate 50 on which the Hall element unit 31 is placed may be an additional component that is provided below the lower yoke 12 of the actuator A-7. However, the actuator A-7 is to be incorporated into an input device such as a mouse. Therefore, the Hall element unit 31 may be placed on a substrate of an input device. In such a case, the structure shown in FIG. 18 is realized when the actuator A-7 is incorporated into an input device. Although the position detecting magnet 30 is attached to the end portion 41 of the arm 40 while the Hall element unit 31 is placed on the substrate 50 in FIG. 18, the locations of the position detecting magnet 30 and the Hall element unit 31 may be reversed.

Eighth Embodiment

Figure 19:
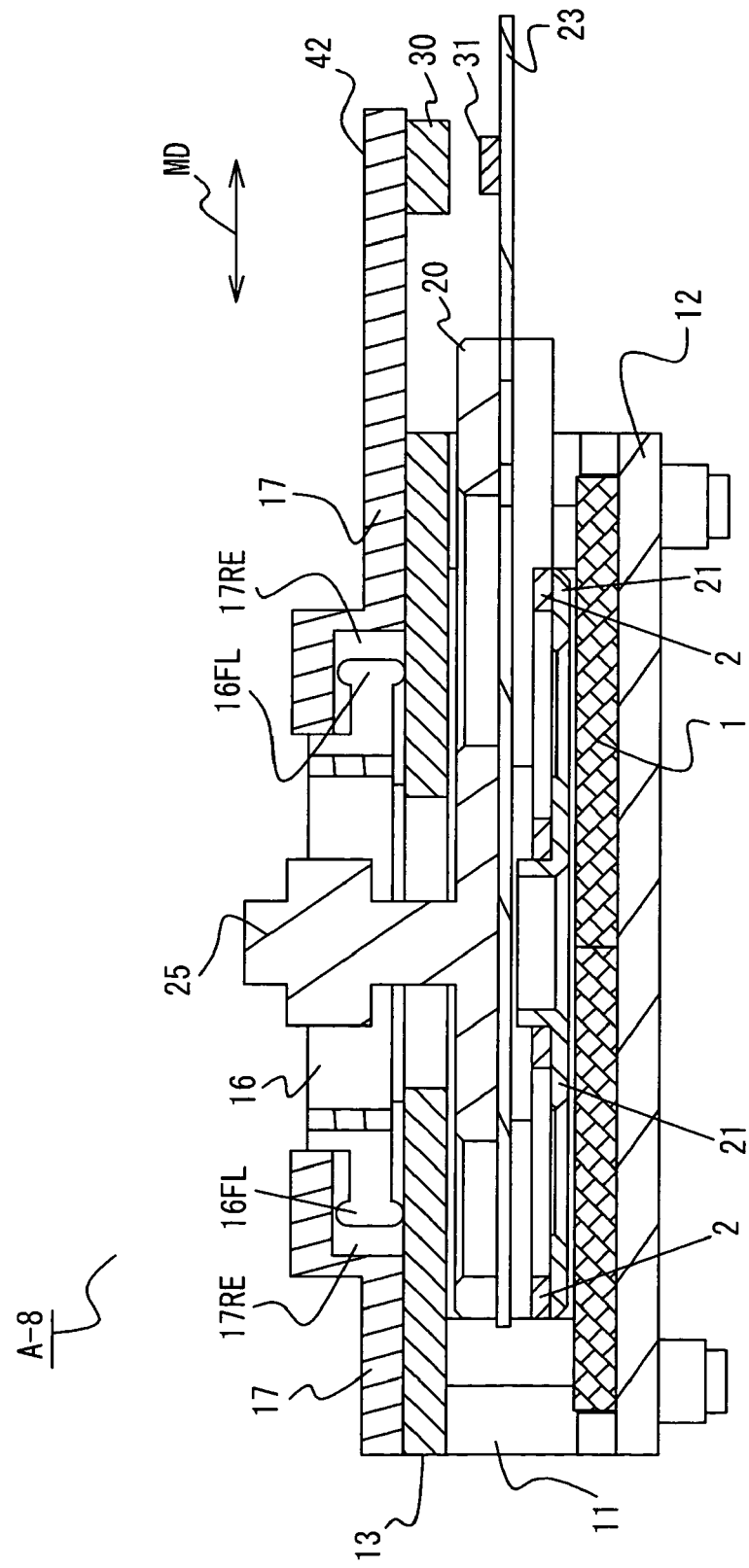
FIG. 19 is a section view of an actuator in accordance with an eighth embodiment of the present invention.

FIG. 19 is a section view of an actuator A-8 in accordance with an eighth embodiment of the present invention. This embodiment is a modification of the seventh embodiment. While the actuator A-7 of the seventh embodiment has the arm 40 hanging down, the actuator A-8 of this embodiment has an arm 42 that extends in a direction MD in which relative motion is caused between the magnet unit 1 and the slider 20. In this embodiment, the arm 42 is formed by partially extending the second guide unit 17. The position detecting magnet 30 is secured to the end portion of the arm 42. The Hall element unit 31 is then placed on an extended portion of the circuit board 23. Although the position detecting magnet 30 is attached to the end portion of the arm 42 while the Hall element 31 is placed on the circuit board 23 in FIG. 19, the locations of the position detecting magnet 30 and the Hall element unit 31 may be reversed. Also, the arm 42 may be formed by extending the upper yoke 13, though the arm 42 shown in FIG. 19 is formed by partially extending the second guide unit 17.

Ninth Embodiment

Figure 20:
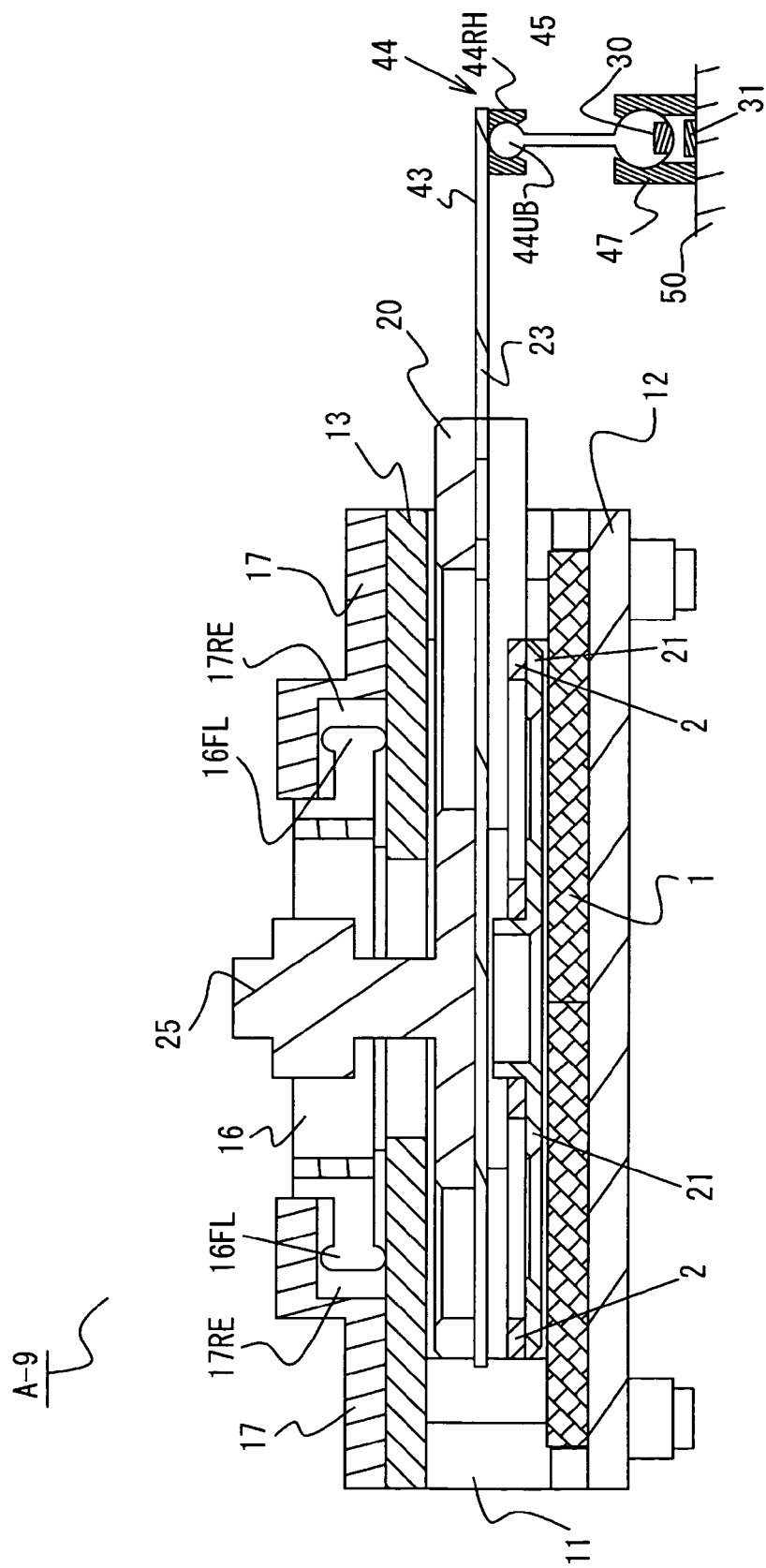
FIG. 20 is a section view of an actuator in accordance with a ninth embodiment of the present invention.

FIG. 20 is a section view of an actuator A-9 in accordance with a ninth embodiment of the present invention. The ninth embodiment is a modification of the eighth embodiment. In the actuator A-8 of the eighth embodiment, the arm 42 simply extends in the relative motion direction MD. The actuator A-9 of this embodiment, on the other hand, has an extension arm 45 hanging down from an arm 43 through an articular mechanism 44. In this embodiment, the arm 43 is formed by partially extending the circuit board 23. The articular mechanism 44 to which the extension arm 45 is rotatably connected is provided under the arm 43. The articular mechanism 44 includes a spherical part 44UB that is connected to the upper end of the extension arm 45, and a supporting part 44RH that holds the spherical part 44UB in a slidable state.

The position detecting magnet 30 is secured to the lower end of the extension arm 45, and is housed in a detecting unit 47 that is secured onto the substrate 50. The Hall element unit 31 is placed in the detecting unit 47, so as to face the position detecting magnet 30.

In the actuator A-9 shown in FIG. 20, the arm 43 moves in synchronization with the slider 20. Here, the extension arm 45 moves its upper end rotatably with respect to the articular mechanism 44, and tilts its main body. With the movement of the extension arm 45, the position detecting magnet 30 attached to the lower end of the extension arm 45 moves accordingly. The Hall element unit 31 then detects the movement.

In this embodiment, the position detecting magnet 30 is attached to the lower end of the extension arm 45 connected through the articular mechanism 44 to the arm 43, which moves in synchronization with the slider 20. The Hall element unit 31 is placed to face the position detecting magnet 30. By virtue of the function of the articular mechanism 44, movement of the position detecting magnet 30 at the lower end of the extension arm 45 can be made smaller than movement of the extension arm 45. Accordingly, the position detecting magnet 30 can be small in size. Although the position detecting magnet 30 is attached to the lower end of the extension arm 45 while the Hall element unit 31 is placed on the substrate 50 in FIG. 20, the locations of the position detecting magnet 30 and the Hall element unit 31 may be reversed.

Figure 21:
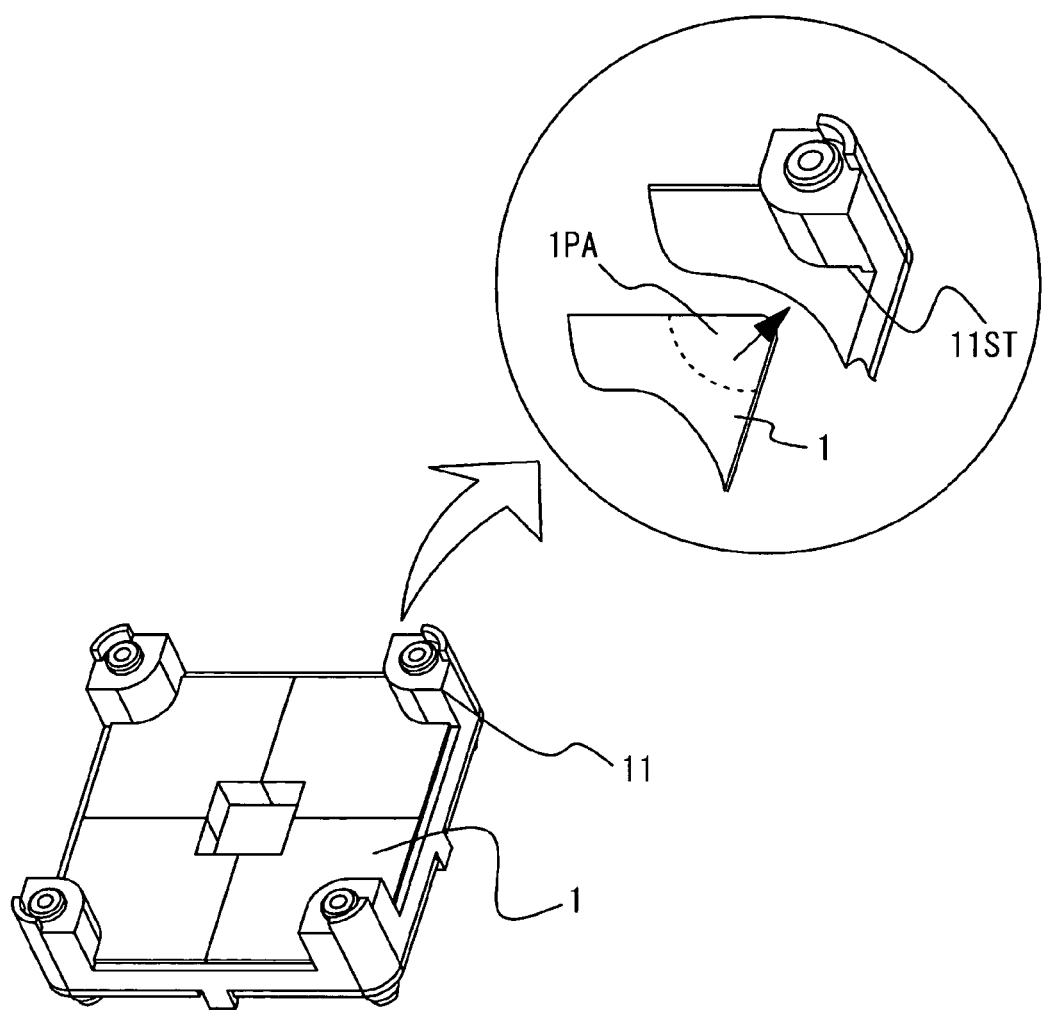
FIG. 21 illustrates a preferred magnet fixing structure that can be employed in any of the embodiments of the present invention.

FIG. 21 illustrates a preferred fixing mechanism of the magnet unit 1 that can be employed in any of the foregoing embodiments. In the actuator A-9 of this embodiment, it is necessary to maintain a predetermined distance between the magnet unit 1 that is fixed onto the lower yoke 12 and serves as the magnetic field generator, and the coils 2 that are secured to the slider 20. In the structure shown in FIG. 21, each end portion 1PA is engaged with the lower part of each corresponding supporting pillar 11 that functions as a spacer. Here, an engaging unit 11ST that restricts movement of the magnet unit 1 is formed. With the supporting pillars 11 having such an engaging function, the predetermined distance between the magnet unit 1 and the coils 2 can be easily maintained. Accordingly, stable driving is performed when current is applied to the coils 2, and accurate position detection can be performed by the Hall elements when the protrusion 25 is moved.

Tenth Embodiment

A tenth embodiment of the present invention will now be described. The tenth embodiment is a modification of the second and third embodiments. In the second and third embodiments, the opening 15 or the non-magnetic region 18 is formed to eliminate distortion of the magnetic field generated from the magnet unit 1 (see FIGS. 8A through 8C and FIGS. 10A through 10C). In an actuator of this embodiment, on the other hand, data that have been gathered by the Hall elements are corrected so that accurate coordinate output can be performed.

Figure 22:
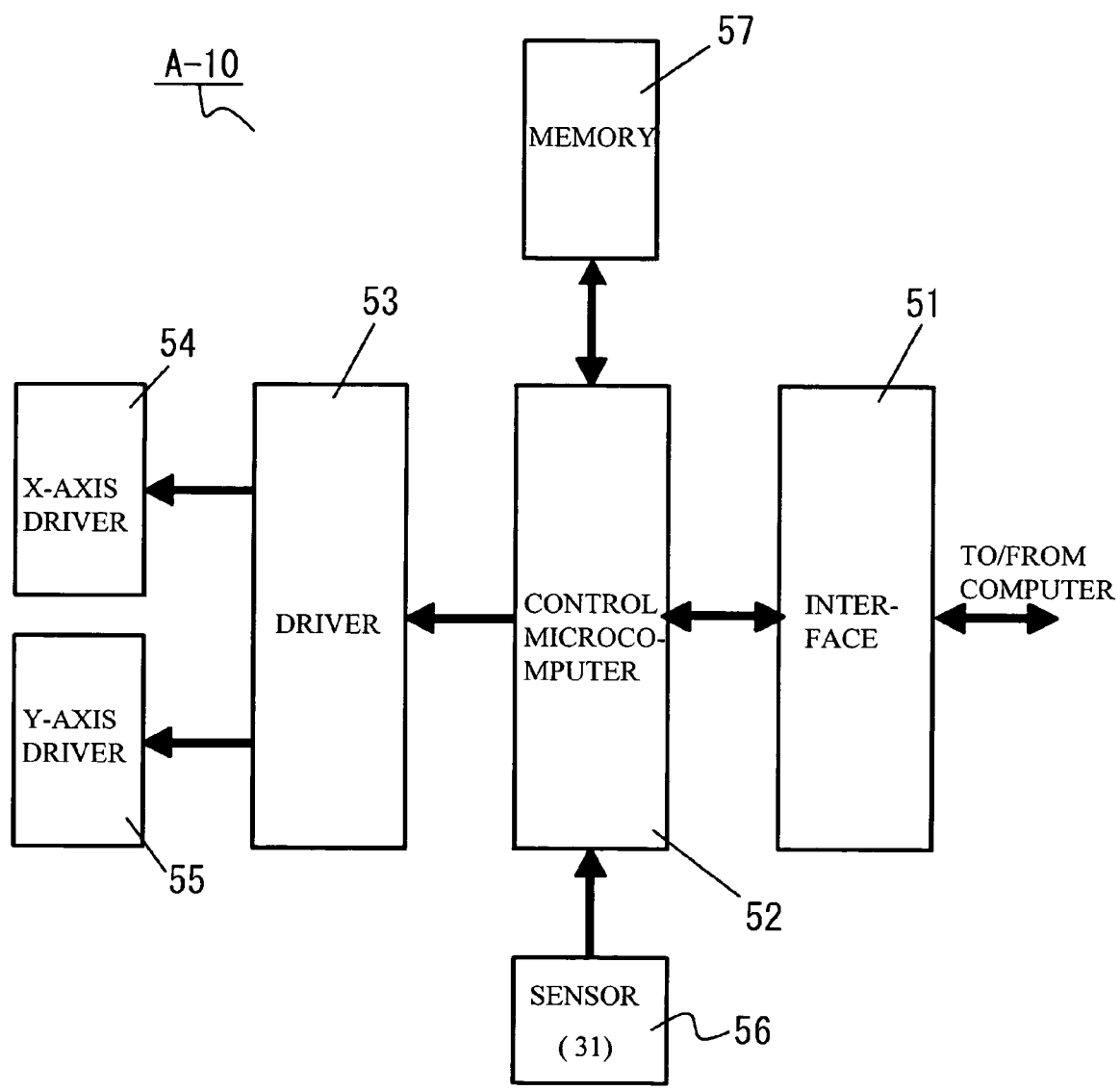
FIG. 22 is a block diagram schematically illustrating the structure of an actuator in accordance with a tenth embodiment of the present invention.

FIG. 22 is a block diagram schematically illustrating the structure of an actuator A-10 in accordance with the tenth embodiment. The external appearance of the actuator A-10 is the same as the external appearance of the actuator A-1 of the first embodiment shown in FIGS. 4 through 6. More specifically, the magnet unit 1 has four magnetic poles that are alternately arranged and surround a predetermined center position. The Hall element unit 31 in the initial state faces the predetermined center position of the magnet unit 1. The Hall element unit 31 has two Hall elements in both the X-axis direction and the Y-axis direction. The Hall element unit 31 is secured to the slider 20. In the initial state, the Hall element unit 31 faces the center position surrounded by the four magnetic poles, but moves in synchronization with the slider 20. When relative motion is caused between the magnet unit 1 and the slider 20, the Hall element unit 31 outputs a detection signal corresponding to the magnetic field generated from the four magnetic poles. The four Hall elements, each two of which are arranged in each corresponding axial direction, perform differential detection in the axial directions. In this manner, movement in the X-axis direction and the Y-axis direction is detected to perform two-dimensional movement detection.

As shown in FIG. 22, the actuator A-10 of the tenth embodiment differs from the actuator A-1 of the first embodiment (see FIG. 7) in that a memory unit 57 is connected to the control microcomputer unit 52. In this embodiment, the control microcomputer unit 52 functions as an operation unit to perform an operation using correction data. The correction data that are outputted from the Hall element and are to be used for correcting detection signals are stored in the memory unit 57. Distortion of the distribution of the magnetic field detected by the Hall elements is to be corrected with the correction data. The control microcomputer unit 52 of this embodiment processes a detection signal supplied from the Hall element unit 31, using the correction data obtained from the memory unit 57. Through the signal processing, the control microcomputer unit 52 removes adverse influence of the distortion of the magnetic field, and then outputs accurate coordinate values corresponding to the movement of the slider 20. Thus, accurate coordinate input can be performed when an operator moves the protrusion 25 of the actuator A-10 incorporated into an input device such as a mouse.

Data that are acquired from measured values or theoretical values may be stored as the correction data in the memory unit 57 in advance. Alternatively, when the protrusion 25 of the actuator A-10 is moved, correction data may be produced based on the detection signal supplied from the Hall element unit 31. The correction data thus produced may be used continuously, or new correction data may be acquired every time the actuator A-10 is activated. The acquisition and storage of the correction data should be controlled by the control microcomputer unit 52.

Figure 23:
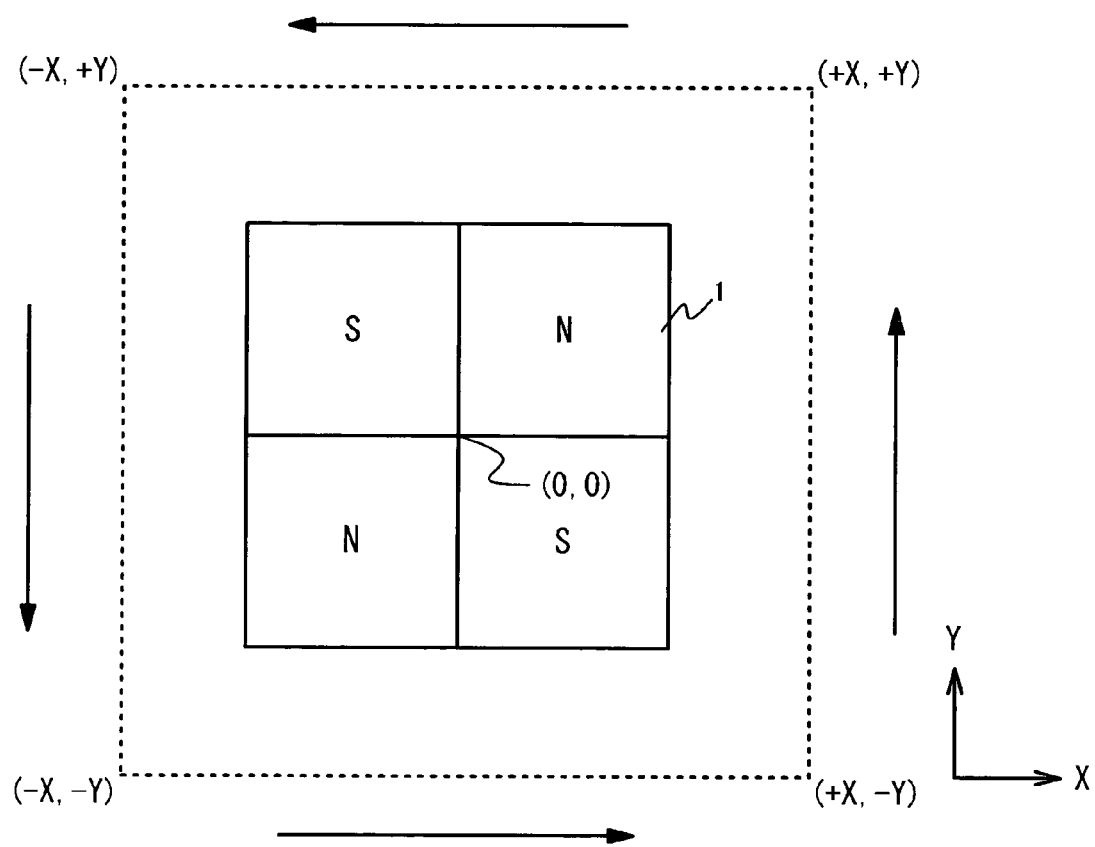
FIG. 23 illustrates an operation to be performed to create correction data.

FIGS. 23 and 24 illustrate an operation to be performed when correction data are created in the actuator A-10. The center position among the four magnetic poles of the magnet unit 1 is set as the origin (0, 0), and the outermost circumference of the moving range of the slider 20 is set as the detection range. The slider 20 is then moved counterclockwise several times. The output signals of the four corners (+X, +Y), (−X, +Y), (−X, −Y), and (+X, −Y), and the largest and smallest values of each side are supplied from the Hall elements, and are then stored. FIG. 24 shows a data table that includes the detected coordinate values at the four corners and the largest and smallest values of each side. Using this data table, the control microcomputer unit 52 performs an operation and outputs corrected coordinate values.

In general, a magnetic field between two magnetic poles has a convex portion in the center, which also causes errors in position detection. In this embodiment, an operation is performed in accordance with the following approximate expressions (1) and (2) each utilizing a quadratic function that is an even function:

$$x = X \cdot [Lx + Wx\{1-(Y/Ly)^2\}]/Lx \quad (1)$$

$$y = Y \cdot [Ly + Wy\{1-(X/Lx)^2\}]/Ly \quad (2)$$

Figure 25:
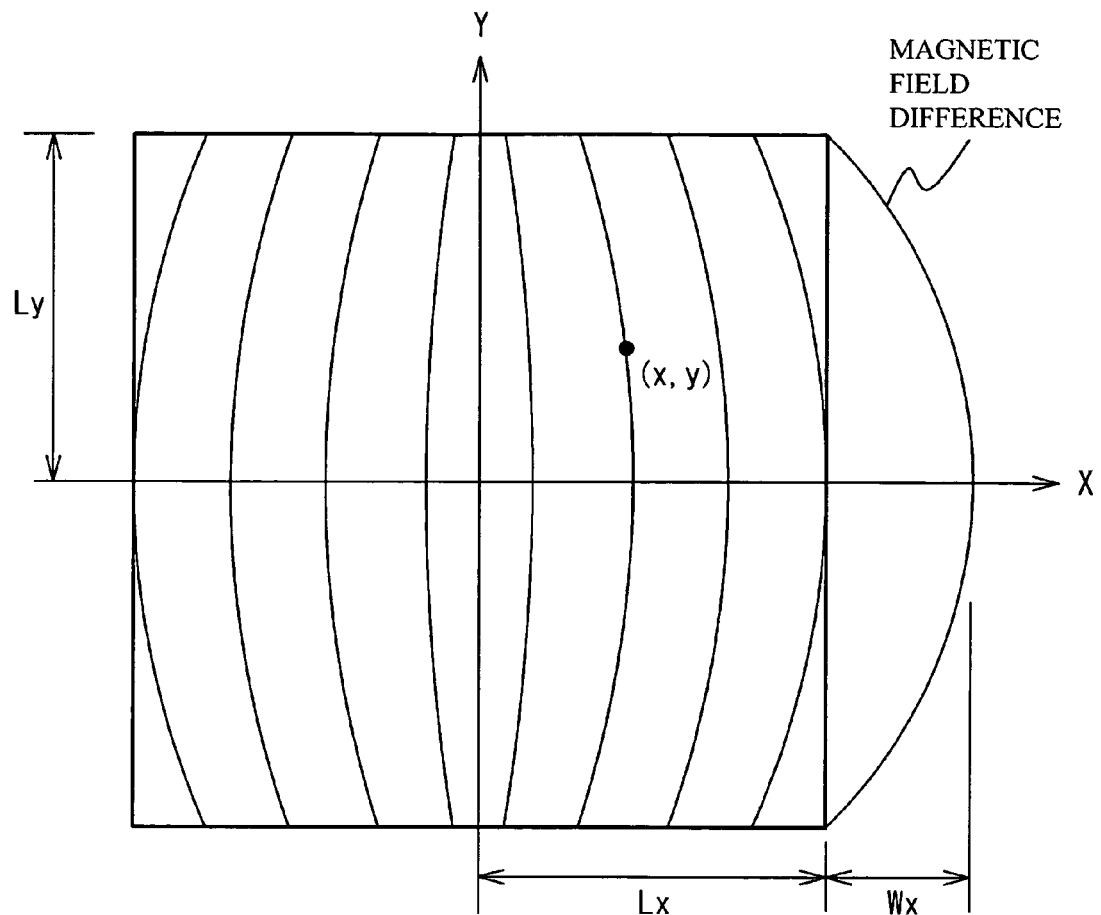
FIG. 25 illustrates the use of approximate expressions.

The variables contained in these expressions exhibit the relationship shown in FIG. 25. The variables Lx, Ly, and Wx are calculated from the table of FIG. 24, and X and Y are calculated from detection signals supplied from the Hall elements when an operator moves the protrusion 25. The variables x and y are the coordinate values of (X, Y) after correction. In this manner, corrected coordinate values can be obtained by substituting output values supplied from the Hall elements for the variables in the approximate expressions (1) and (2).

Figure 26:
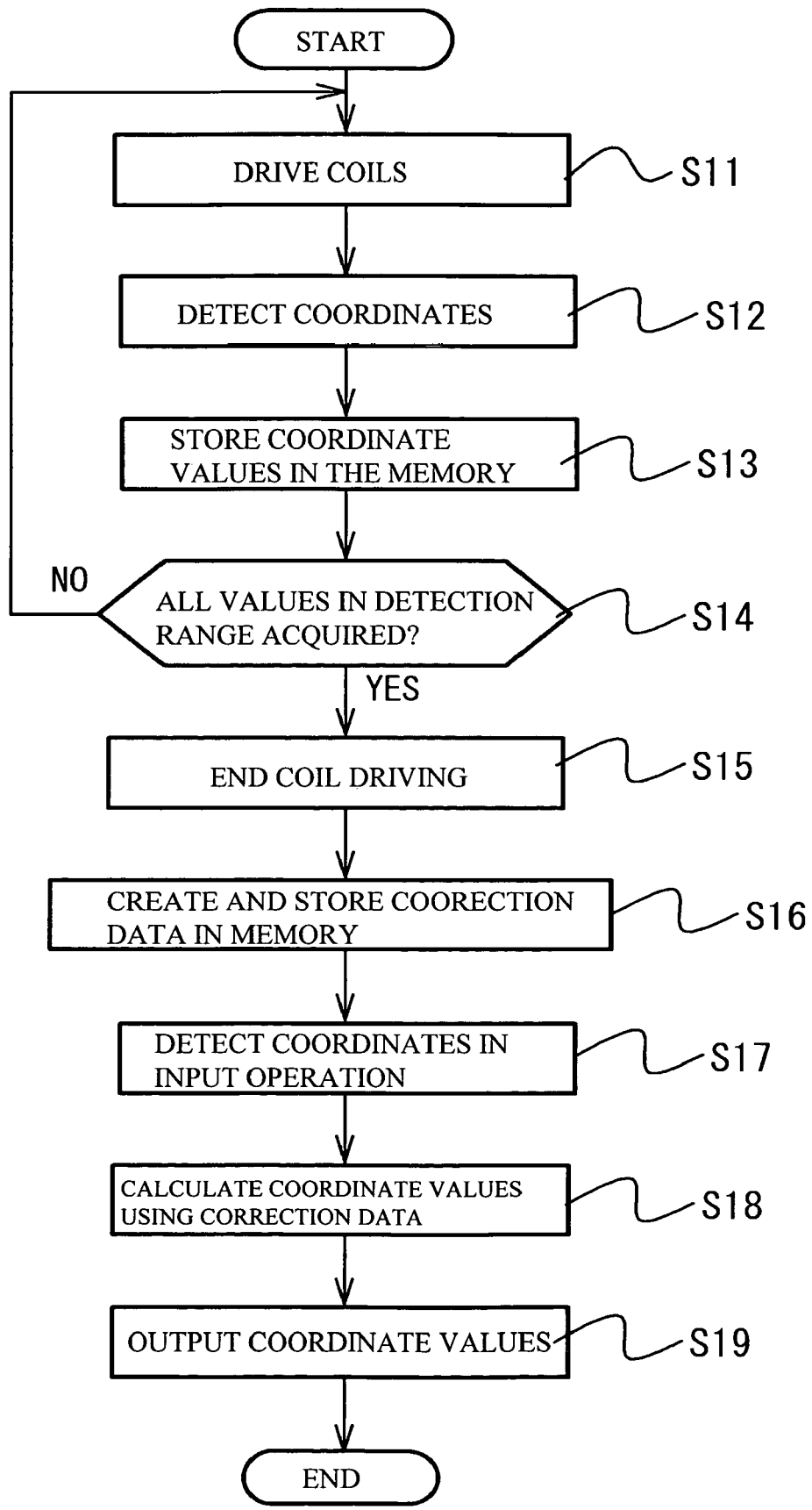
FIG. 26 is a flowchart of an operation to be performed by the control microcomputer unit of the actuator in accordance with the tenth embodiment.

FIG. 26 is a flowchart of an operation to be performed by the control microcomputer unit 52. This flowchart shows an example operation to be performed in a case where correction data are automatically acquired when the actuator A-10 is activated, and are utilized when input is performed by an operator. When the actuator A-10 is activated, the control microcomputer unit 52 applies a predetermined amount of current to the coils 2 (step S11), and starts coordinate detection (step S12). The coordinate detection is performed to detect distortion of the magnetic field generated from the magnet unit 1. The coils 2 are forcibly driven in the detection range shown in FIG. 23, so that the slider 20 holding the coils 2 is moved. As the Hall elements are secured to the slider 20, a signal is outputted every time a distorted magnetic field is detected while the slider 20 is being moved.

As the slider 20 is moved in the range shown in FIG. 23, the coordinate values at the four corners and the largest values and the smallest values are stored in the memory unit 57 (step S13). After obtaining all the coordinate values in the predetermined detection range, the control microcomputer unit 52 ends the data accumulation (step S14), and stops the current supply to the coils 2 (step S15). At this point, the control microcomputer unit 52 creates predetermined correction data for correcting detection signals to be supplied from the Hall elements, and stores the correction data in the memory unit 57 (step S16).

After the preparation is completed in the actuator A-10, an operator moves the protrusion 25 to perform an input operation. As the protrusion 25 is moved, the Hall element unit 31 moves and outputs a detection signal in accordance with the magnetic field (step S17). The detection signal is supplied to the control microcomputer unit 52. The control microcomputer unit 52 then retrieves the correction data from the memory unit 57, and performs an operation using the above mentioned approximate expressions (step S18). In this manner, the detection signal supplied from the Hall elements is corrected based on the correction data, and accurate coordinates are determined even if there is distortion of the magnetic field generated from the magnet unit 1. The movement of the protrusion 25 (or the coils 2) relative to the magnet unit 1 is accurately detected, and is converted into coordinate output values (step S19). In this manner, accurate coordinate input can also be performed with the actuator A-10 in which the Hall element unit 31 detects movement of the protrusion 25, and coordinate input is performed based on the detection signal.

Although the coordinate detection for gathering correction data is automatically performed by driving the coils 2 in the flowchart shown in FIG. 26, it is possible to perform the coordinate detection manually. Also, once acquired, the correction data may be permanently stored in the memory unit 57, so that the operation can start from the procedure of step S17 for the second time and later.

So far, actuators have been described as the embodiments of the present invention. Each of these actuators includes a structure for performing accurate coordinate input, as well as a driving unit that moves in a plane. An input device such as a mouse into which one of the above actuators is incorporated should be very useful as a man-machine interface.

In any of the above described embodiments of the present invention, the magnet unit 1 may be a permanent magnet unit or an electromagnet unit with coils. In a case of an electromagnet unit, it is possible to use hallow coils or coils with bobbins. Where an electromagnet unit is employed as the magnet unit 1 having an opening in the middle, four coils are first arranged to contact with one another, and an opening of a predetermined shape is fabricated in the center position, for example, by pushing a material of the predetermined shape into the center position. Also, Hall elements are employed as electromagnetic conversion elements in the above described embodiments of the present invention, but magneto-resistive elements (MR elements) may be employed, instead of Hall elements.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An actuator having an input function, comprising:
   a magnetic field generator that has different magnetic poles alternately arranged in a plane, with a predetermined position being the center of the magnetic poles;
   a coil holder that holds a plurality of coils that are radially arranged and face the magnetic field generator, relative motion in a planar direction being caused between the magnetic field generator and the coil holder; and
   an electromagnetic conversion unit that detects the relative motion and generates input planar coordinate data, and is mounted on one of the magnetic field generator and the coil holder, wherein:
   when the coil holder and the magnetic field generator are located in initial positions, the electromagnetic conversion unit is located in such a position as to face boundaries between the magnetic poles, or in such a position as not to face the magnetic poles of the magnetic field generator,
   the magnetic field generator further comprises:
      an opening located in the predetermined position,
      an upper yoke and a lower yoke, and the lower yoke comprises the opening,
   the coil holder has the electromagnetic conversion unit placed in such a position as to face the opening, and
   a size of the opening is within 80% to 120% of a size of a region in which the electromagnetic conversion unit moves.

2. The actuator as claimed in claim 1, wherein, when the coil holder and the magnetic field generator are located in the initial positions, the electromagnetic conversion unit is located in such a position as to face the respective magnetic poles.

3. The actuator as claimed in claim 1, wherein the coil holder has the electromagnetic conversion unit placed in such a position as to face each of the boundaries between the magnetic poles of the magnetic field generator.

4. The actuator as claimed in claim 1, wherein the opening has a shape that is axisymmetrical about two axes that pass through the center point of the opening and are perpendicular to each other.

5. An actuator, comprising:
   a magnetic field generator that has different magnetic poles alternately arranged in a plane, with a predetermined position being the center of the magnetic poles;
   a coil holder that holds a plurality of coils that are radially arranged and face the magnetic field generator, relative motion in a planar direction being caused between the magnetic field generator and the coil holder; and
   an electromagnetic conversion unit that detects the relative motion so as to input planar coordinate data and is mounted on one of the magnetic field generator and the coil holder, wherein:
   when the coil holder and the magnetic field generator are located in initial positions, the electromagnetic conversion unit is located in such a position as to face boundaries between the magnetic poles, or in such a position as not to face the magnetic poles of the magnetic field generator,
   the magnetic field generator further comprises:
      a non-magnetic region located in the predetermined position,
      an upper yoke and a lower yoke, and the lower yoke comprises the non-magnetic region,
   the coil holder has the electromagnetic conversion unit placed in such a position as to face the non-magnetic region, and
   a size of the non-magnetic region is within 80% to 120% of a size of the region in which the electromagnetic conversion unit moves.

6. The actuator as claimed in claim 5, wherein the non-magnetic region has a shape that is axisymmetrical about two axes that pass through the center point of the non-magnetic region and are perpendicular to each other.

7. The actuator as claimed in claim 1, further comprising:
   a memory unit that stores correction data to be used for correcting distortion of magnetic field distribution of the magnetic field generator; and
   an operation unit that performs an operation using a detection signal supplied from the electromagnetic conversion unit and the correction data stored in the memory unit.

8. The actuator as claimed in claim 7, wherein the correction data are created based on data that have been acquired by applying current to the coils at the time of activation and causing relative motion between the coil holder and the magnetic field generator.

9. The actuator as claimed in claim 7, wherein the operation unit calculates corrected coordinate values after processing a detection signal supplied from the electromagnetic conversion unit, using predetermined approximate expressions.

10. The actuator as claimed in claim 1, wherein:
    one of the magnetic field generator and the coil holder has a position detecting magnet in a position corresponding to the predetermined position; and
    the other one of the magnetic field generator and the coil holder has the electromagnetic conversion unit in such a position as to face the position detecting magnet.

11. The actuator as claimed in claim 1, wherein:
    the coil holder has an arm that extends outward, one of the electromagnetic conversion unit and a position detecting magnet being attached to an end portion of the arm; and
    the other one of the electromagnetic conversion unit and the position detecting magnet is placed in such a position as to face the end portion.

12. The actuator as claimed in claim 1, wherein:
    the magnetic field generator has an arm that extends outward, one of the electromagnetic conversion unit and a position detecting magnet being attached to an end portion of the arm; and
    the other one of the electromagnetic conversion unit and the position detecting magnet is placed in such a position as to face the end portion.

13. The actuator as claimed in claim 11, wherein:
the arm extends in a direction parallel or perpendicular to the relative motion direction; and
the end portion is located in such a position as to avoid adverse influence of a surrounding magnetic field.

14. The actuator as claimed in claim 1, wherein:
the magnetic field generator has an arm that extends in the relative motion direction, an extension arm that extends in a direction perpendicular to the relative motion direction being connected to the arm through an articular mechanism, one of the electromagnetic conversion unit and a position detecting magnet being attached to an end portion of the extension arm; and
the other one of the electromagnetic conversion unit and the position detecting magnet is placed in such a position as to face the end portion.

15. The actuator as claimed in claim 1, wherein:
the coil holder has an arm that extends in the relative motion direction, an extension arm that extends in a direction perpendicular to the relative motion direction being connected to the arm through an articular mechanism, one of the electromagnetic conversion unit and a position detecting magnet being attached to an end portion of the extension arm; and
the other one of the electromagnetic conversion unit and the position detecting magnet is placed in such a position as to face the end portion.

16. The actuator as claimed in claim 1, wherein one of the magnetic field generator and the coil holder has an operation protrusion.

17. The actuator as claimed in claim 1, wherein the electromagnetic conversion unit includes Hall elements, every two of which are arranged in a first axial direction or in a second axial direction that is perpendicular to the first axial direction.

18. The actuator as claimed in claim 1, wherein the magnetic field generator includes a permanent magnet that is magnetized to form a plurality of magnetic sections.

19. The actuator as claimed in claim 1, wherein:
the magnetic field generator is supported by one of an upper yoke and a lower yoke, while the coil holder is supported by the other one of the upper yoke and the lower yoke; and
the upper yoke and the lower yoke are secured through a spacer unit that has an engaging unit for maintaining a predetermined distance between the upper yoke and the lower yoke.

20. The actuator as claimed in claim 5, further comprising:
a memory unit that stores correction data to be used for correcting distortion of magnetic field distribution of the magnetic field generator; and
an operation unit that performs an operation using a detection signal supplied from the electromagnetic conversion unit and the correction data stored in the memory unit.

21. The actuator as claimed in claim 20, wherein the correction data is created based on data that has been acquired by applying current to the coils at a time of activation and causing relative motion between the coil holder and the magnetic field generator.

22. The actuator as claimed in claim 20, wherein the operation unit calculates correction coordinate values after processing a detection signal supplied from the electromagnetic conversion unit, using predetermined approximate expressions.

23. The actuator as claimed in claim 5, wherein:
one of the magnetic field generator and the coil holder has a position detecting magnet in a position corresponding to the predetermined position; and
the other one of the magnetic field generator and the coil holder has the electromagnetic conversion unit in such a position as to face the position detecting magnet.

24. The actuator as claimed in claim 5, wherein:
the coil holder has an arm that extends outward, one of the electromagnetic conversion unit and a position detecting magnet being attached to an end portion of the arm; and
the other one of the electromagnetic conversion unit and the position detecting magnet is placed in such a position as to face the end portion.

25. The actuator as claimed in claim 5, wherein:
the magnetic field generator has an arm that extends outward, one of the electromagnetic conversion unit and a position detecting magnet being attached to an end portion of the arm; and
the other one of the electromagnetic conversion unit and the position detecting magnet is placed in such a position as to face the end portion.

26. The actuator as claimed in class 24, wherein:
the arm extends in a direction parallel or perpendicular to the relative motion direction; and
the end portion is located in such a position as to avoid adverse influence of a surrounding magnetic field.

27. The actuator as claimed in class 5, wherein:
the magnetic field generator has an arm that extends in the relative motion direction, an extension arm that extends in a direction perpendicular to the relative motion direction being connected to the arm through an articular mechanism, one of the electromagnetic conversion unit and a position detecting magnet being attached to an end portion of the extension arm; and
the other one of the electromagnetic conversion unit and the position detecting magnet is placed in such a position as to face the end portion.

28. The actuator as claimed in claim 5, wherein:
the coil holder has an arm that extends to the relative motion direction, an extension arm that extends in a direction perpendicular to the relative motion direction being connected to the arm through an articular mechanism, one of the electromagnetic conversion unit and a position detecting magnet being attached to an end portion of the extension arm; and
the other one of the electromagnetic conversion unit and the position detecting magnet is placed in such a position as to face the end portion.

29. The actuator as claimed in claim 5, wherein one of the magnetic field generator and the coil holder has an operation protrusion.

30. The actuator as claimed in claim 5, wherein the electromagnetic conversion unit includes Hall elements, every two of which are arranged in a first axial direction or in a second axial direction that is perpendicular to the first axial direction.

31. The actuator as claimed in claim 5, wherein the magnetic field generator includes a permanent magnet that is magnetized to form a plurality of magnetic sections.

32. The actuator as claimed in claim 5, wherein:
the magnetic field generator is supported by one of an upper yoke and a lower yoke, while the coil holder is supported by the other one of the upper yoke and the lower yoke; and the upper yoke and the lower yoke are secured through a spacer unit that has an engaging unit for maintaining a predetermined distance between the upper yoke and the lower yoke.

33. An electromagnetic actuator, comprising:

a magnetic field generator that has different magnetic poles alternately arranged in a plane, with an opening located in a center of the magnetic poles;

a coil holder that holds a plurality of coils that are radially arranged and face the magnetic field generator, relative motion in a planar direction being caused between the magnetic field generator and the coil holder; and an electromagnetic conversion unit that detects the relative motion and generates input planar coordinate data, and is mounted on one of the magnetic field generator and the coil holder, wherein:

the magnetic field generator further comprises an upper yoke and a lower yoke, and the lower yoke comprises the opening, and a size of the opening is within 80% to 120% of a size of a region in which the electromagnetic conversion unit moves.

34. An actuator, comprising:

a generator comprising an upper yoke and a lower yoke, which has an opening located in a center of the magnetic poles, the generator having magnetic poles alternately arranged in a plane;

a plurality of coils that are radially arranged and face the generator, relative motion in a planar direction being caused between the generator and the coils; and a conversion unit that detects the relative motion and generates input planar coordinate data, wherein:

a size of the opening is within 80% to 120% of a size of a region in which the conversion unit moves.

* * * * *